(12) United States Patent
Kido

(10) Patent No.: US 7,424,050 B2
(45) Date of Patent: Sep. 9, 2008

(54) MATCHED FILTER CIRCUIT AND CORRELATION CALCULATION METHOD

(75) Inventor: Naoshige Kido, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 791 days.

(21) Appl. No.: 10/969,980

(22) Filed: Oct. 22, 2004

(65) Prior Publication Data

US 2005/0160304 A1 Jul. 21, 2005

(30) Foreign Application Priority Data

Oct. 24, 2003 (JP) ............ P. 2003-365039

(51) Int. Cl.
*H04B 1/00* (2006.01)

(52) U.S. Cl. .............. 375/152; 375/150; 375/143; 375/137; 375/130

(58) Field of Classification Search ......... 375/130–137, 375/142–152
See application file for complete search history.

(56) References Cited

U.S. PATENT DOCUMENTS

| | | | |
|---|---|---|---|
| 6,370,130 B1 * | 4/2002 | Zhou et al. ............ | 370/335 |
| 6,389,438 B1 | 5/2002 | Zhou | |
| 6,487,193 B1 | 11/2002 | Hamada et al. | |
| 6,891,885 B2 * | 5/2005 | Imaizumi ............. | 375/150 |
| 6,895,038 B2 * | 5/2005 | Saito et al. ........... | 375/148 |
| 2004/0042537 A1 * | 3/2004 | Frank ................... | 375/152 |
| 2004/0071200 A1 * | 4/2004 | Betz et al. ............ | 375/152 |
| 2004/0071289 A1 * | 4/2004 | Rose et al. ........... | 380/37 |

FOREIGN PATENT DOCUMENTS

| | | |
|---|---|---|
| JP | 11-312952 | 11/1999 |
| JP | 2000-82973 | 3/2000 |
| JP | 3322246 B2 | 6/2002 |
| JP | 2003-32143 | 1/2003 |

* cited by examiner

*Primary Examiner*—David C. Payne
*Assistant Examiner*—Linda Wong
(74) *Attorney, Agent, or Firm*—McDermott Will & Emery LLP

(57) ABSTRACT

There are provided input route selecting means 711-713 and 723-725 for selecting, in accordance with the oversampling phase, input routes along which reception data and codes are to be input to individual shift register means, a plurality of data shift register means 707-710 that are caused by the input route selecting means to operate in groups corresponding to respective oversampling phases, code shift register means 719-722 corresponding to the respective data shift register means 707-710, and despreading integration calculating means 702 and 704. Correlation calculations are performed while reception data are stored in the tap groups efficiently, whereby the search window width is increased when the oversampling setting number is low. Further, the power consumption is reduced by lowering the shift frequency of the shift register means.

6 Claims, 23 Drawing Sheets

MATCHED FILTER CIRCUIT AND CORRELATION CALCULATION METHOD

BACKGROUND OF THE INVENTION

1. Field of the Invention

The present invention relates to a matched filter circuit used for synchronization establishment processing etc. of the spread spectrum communication as well as to a correlation calculation method therefor.

2. Description of the Related Art

In recent years, in mobile communication systems, the spread spectrum communication capable of high-speed and high-quality data communication, in particular, CDMA (code division multiple access), has become a mainstream technology. Various techniques (e.g., Japanese Patent No. 3,322,246) have been developed to construct newest mobile communication systems of this communication scheme and to solve fundamental problems of the mobile communication such as fading.

In general, CDMA base station systems incorporate a large number of large-scale reception circuits to serve for a large number of users. This leads to problems that the system cost increases with the circuit scale and the heat generation increases with the power consumption. On the other hand, mobile terminals have a problem that increase in circuit scale shortens the battery driving time.

Therefore, in both of base station systems and mobile terminals, it is strongly desired to reduce the circuit scale of reception systems or efficiently use limited circuit resources. Among such issues to be addressed, increase in functionality and reduction in power consumption are urgent issues to be attained in matched filters that are used in mobile terminals and base station reception systems.

FIG. 23 is a block diagram showing the configuration of the main part of a general CDMA reception apparatus. As shown in FIG. 23, the CDMA reception apparatus is equipped with a reception antenna 2301, a radio-frequency signal processing unit 2302 for performing prescribed filtering and amplification, an A/D converter 2303, a demodulator 2304, a decoder 2305, a codec unit 2306 for converting a decoded signal into a voice, and a matched filter 2307. The matched filter 2307 performs a correlation calculation on a spread spectrum reception signal and outputs a correlation result.

Matched filters, which are used in reception units of base station systems and mobile terminal systems in the above-described manner, output data (a delay profile) indicating to what degree data the system is about to receive will delay from reference timing. Timing information is generated on the basis of the delay profile and RAKE reception is performed.

In general, a baseband signal processing unit of a transmission unit of a CDMA mobile communication system processes data to be sent with a chiprate (i.e., spreading code rate) as a minimum unit. On the other hand, on the reception side, to increase the timing accuracy, the timing accuracy of a delay profile that is generated by the matched filter of a baseband processing unit of a reception unit is set higher than that of a one-chip interval by using an oversampling technique.

More specifically, an A/D converter that is provided immediately upstream of the matched filter generates data through 4-fold, 2-fold, or 1-fold oversampling that depends on necessary timing accuracy. The generated data is input to the matched filter and subjected to a calculation there. The matched filter also operates in accordance with the oversampling setting number.

The number of taps of the matched filter affects the circuit scale to a large extent. Therefore, in conventional matched filters, to reduce the circuit scale, 1-symbol integration is performed time-divisionally. For example, a matched filter circuit that performs 1-symbol integration in four divisional intervals incorporates a RAM for decreasing the number of taps to ¼ of a case that 1-symbol integration is performed at once and for performing cumulative addition on a ¼-symbol basis.

FIG. 1 is a block diagram showing the configuration of a conventional 1-symbol integration, 4-time-divisional matched filter circuit. As shown in FIG. 1, the matched filter circuit 100 is composed of a data shift register unit 101, a complex multiplication unit 102, a code shift register unit 103, a cumulative addition unit 104, and a RAM unit 105.

The data shift register unit 101 stores and shifts data of two systems (i.e., I and Q channels), the complex multiplication unit 102 despreads the data of the two systems (i.e., I and Q channels) by complex multiplication, and the code shift register unit 103 shifts and stores replica codes of the two systems (i.e., I and Q channels) that are necessary for the despreading. The cumulative addition unit 104 adds up despread correlation data of the respective chips and cumulatively adds results of 1-symbol integration, 4-time-divisional processing, and the RAM unit 105 stores a result of the 1-symbol integration, 4-time-divisional processing.

Although the data shift register unit 101, the complex multiplication unit 102, the code shift register unit 103, the cumulative addition unit 104, and the RAM unit 105 process data of the two systems (i.e., I and Q channels), only the processing for one channel will be described below to simplify the description.

It is assumed that one symbol consists of 256 chips, the number of taps is equal to 64 (a 1-symbol integration time is divided into four intervals), and the oversampling setting number is 4, 2, or 1. The sampling phases of data that are input to the matched filter circuit 100 are denoted by characters A, B, C, and D in the case of 4-fold oversampling setting, by characters A and C in the case of 2-fold oversampling setting, and by character A in the case of 1-fold oversampling setting.

The data shift register unit 101 incorporates 64 tap register units 106 that correspond to the respective taps and are connected to each other in a shift register structure. Outputs of the respective tap registers 106 serve as outputs of the respective taps of the data shift register 101. Each tap register unit 106 has a shift register structure consisting of four registers, four being the maximum oversampling setting number.

FIG. 2 is a timing chart outlining the processing and a search window width of the conventional 1-symbol integration, 4-time-divisional matched filter circuit 100. In FIG. 2, character A denotes timing of a reception signal portion at the head of a search window that comes earliest among reception signal portions to be subjected to the despreading. Character B denotes replica codes that are necessary for despreading the reception signal and that are arranged on the time axis so as to correspond to the reception signal portion at the head of the search window.

Characters C, D, E, F, G, H, I, and J denote data processing units in a state that a one-round sequence of data to be received has been captured by the 1-symbol integration, 4-time-divisional matched filter circuit 100. Each data processing unit has a ¼-symbol length. Therefore, to generate a delay profile by processing a 1-symbol portion of the reception signal, it is necessary to perform time-divisional processing four times (C, D, E, and F).

Processing of one time that is performed on ¼-symbol reception data by the 1-symbol integration, 4-time-divisional matched filter circuit 100 will be described below together with details of replica codes that are necessary for the processing.

To generate delay profile data for reception data in a reception signal interval a, first, replica codes to be used for despreading are input to the code shift register unit 103 of the matched filter circuit 100 by timing K. The replica codes are serial/parallel-converted at timing K and resulting codes are held until timing L by code holding register circuits of all taps of each tap group. Fixed replica codes are output to all taps of the complex multiplication unit 102.

A ¼-symbol delay profile M is calculated by shifting the reception data in the data shift register unit 101 until timing L in this state. Likewise, ¼-symbol delay profiles N, O, and P are calculated. A 1-symbol delay profile S obtained by cumulative addition is output from timing Q to timing R.

An important thing is that since the length of a reception signal interval that can be set at each moment in the data shift register unit 101 in the case of 4-fold, 2-fold, or 1-fold oversampling setting is equal to the ¼-symbol length, it is necessary to set codes for a reception signal portion in the next interval b and calculates a delay profile N immediately after calculation of a delay profile M of the reception signal interval a (C).

Therefore, in the conventional 1-symbol integration, 4-time-divisional matched filter circuit 100, the search window width becomes a ¼-symbol length when any of 4-fold, 2-fold, and 1-fold oversampling is set.

FIG. 3 is a timing chart showing a control signal, output signals TAPD0 to TAPD63 of the data shift register unit 101, and an output S of the cumulative addition unit 104 as a partial integration result of the conventional 1-symbol integration, 4-time-divisional matched filter circuit 100 of FIG. 1 in a case that 4-fold oversampling is set.

Input data having sampling phases A0, B0, C0, D0, A1, B1, C1, D1, . . . are captured in this order by the data shift register unit 101 in synchronism with respective clock pulses that are input to the data shift register unit 101, and the data are shifted.

As a result of the sequential shifts in the data shift register unit 101, an integration result for the sampling phases A0 to A63 is output as an output SA0 (output S) at timing of clock edge No. 253. An integration result for the sampling phases B0 to B63 is output as an output SB0 at timing of clock edge No. 254. An integration result for the sampling phases C0 to C63 is output as an output SC0 at timing of clock edge No. 255. An integration result for the sampling phases D0 to D63 is output as an output SD0 at timing of clock edge No. 256.

FIG. 4 is a timing chart showing a control signal, output signals TAPD0 to TAPD63 of the data shift register unit 101, and an output S of the cumulative addition unit 104 as a partial integration result of the conventional 1-symbol integration, 4-time-divisional matched filter circuit 100 of FIG. 1 in a case that 2-fold oversampling is set.

Input data having sampling phases A0, C0, A1, C1, A2, C2, A3, C3, . . . are captured in this order by the data shift register unit 101 in synchronism with respective clock pulses that are input to the data shift register unit 101, and the data are shifted.

As a result of the sequential shifts in the data shift register unit 101, an integration result for the sampling phases A0 to A63 is output as an output SA0 (output S) at timing of clock edge No. 253 and an integration result for the sampling phases C0 to C63 is output as an output SC0 at timing of clock edge No. 255.

FIG. 5 is a timing chart showing a control signal, output signals TAPD0 to TAPD63 of the data shift register unit 101, and an output S of the cumulative addition unit 104 as a partial integration result of the conventional 1-symbol integration, 4-time-divisional matched filter circuit 100 of FIG. 1 in a case that 1-fold oversampling is set.

Input data having sampling phases A0, A1, A2, A3, A4, A5, A6, A7, . . . are captured in this order by the data shift register unit 101 in synchronism with respective clock pulses that are input to the data shift register unit 101, and the data are shifted.

As a result of the sequential shifts in the data shift register unit 101, an integration result for the sampling phases A0 to A63 is output as an output SA0 (output S) at timing of clock edge No. 253.

FIG. 6 is a timing chart showing how a delay profile as a 1-symbol correlation result is generated from partial integration results (see FIGS. 3-5) when each kind of oversampling is set.

Where 4-fold oversampling is set, a partial integration result SA0 for the sampling phase A, a partial integration result SB0 for the sampling phase B, a partial integration result SC0 for the sampling phase C, and a partial integration result SD0 for the sampling phase D are calculated sequentially in synchronism with respective clock pulses from clock edge No. 1 for the first ¼ symbol (in the head search window) on the basis of which a delay profile is to be generated.

Results SA0-SA63, SB0-SB63, SC0-SC63, and SD0-SD63 that are output sequentially in the above manner are partial integration results of the first ¼ symbol on the basis of which a delay profile is to be generated, and hence are stored at addresses 0-255 of the RAM unit 105.

Results SA64-SA127, SB64-SB127, SC64-SC127, and SD64-SD127 that are output from clock edge No. 257 are partial integration results of the second ¼ symbol on the basis of which a delay profile is to be generated. Therefore, the partial integration results SA0-SA63, SB0-SB63, SC0-SC63, and SD0-SD63 of the first ¼ symbol that are stored at addresses 0-255 of the RAM unit 105 are read out, and partial integration results (SA0+SA64) to (SA63+SA127), (SB0+SB64) to (SB63+SB127), (SC0+SC64) to (SC63+SC127), and (SD0+SD64) to (SD63+SD127) of the first ²⁄₄ symbol on the basis of which a delay profile is to be generated are calculated and stored at the same addresses of the RAM unit 105.

Results SA128-SA191, SB128-SB191, SC128-SC191, and SD128-SD191 that are output from clock edge No. 513 are partial integration results of the third ¼ symbol on the basis of which a delay profile is to be generated. Therefore, the partial integration results (SA0+SA64) to (SA63+SA127), (SB0+SB64) to (SB63+SB127), (SC0+SC64) to (SC63+SC127), and (SD0+SD64) to (SD63+SD127) of the first ²⁄₄ symbol that are stored at addresses 0-255 of the RAM unit 105 are read out, and partial integration results (SA0+SA64+SA128) to (SA63+SA127+SA191), (SB0+SB64+SB128) to (SB63+SB127+SB191), (SC0+SC64+SC128) to (SC63+SC127+SC191), and (SD0+SD64+SD128) to (SD63+SD127+SD191) of the first ¾ symbol on the basis of which a delay profile is to be generated are calculated and stored at the same addresses of the RAM unit 105.

Results SA192-SA255, SB192-SB255, SC192-SC255, and SD192-SD255 that are output from clock edge No. 769 are partial integration results of the fourth ¼ symbol on the basis of which a delay profile is to be generated. Therefore, the partial integration results (SA0+SA64+SA128) to (SA63+SA127+SA191), (SB0+SB64+SB128) to (SB63+SB127+SB191), (SC0+SC64+SC128) to (SC63+SC127+SC191), and (SD0+SD64+SD128) to (SD63+SD127+SD191) of the first ¾ symbol that are stored at addresses

0-255 of the RAM unit 105 are read out, and partial integration results (SA0+SA64+SA128+SA192) to (SA63+SA127+SA191+SA255), (SB0+SB64+SB128+SB192) to (SB63+SB127+SB191+SB255), (SC0+SC64+SC128+SC192) to (SC63+SC127+SC191+SC255), and (SD0+SD64+SD128+SD192) to (SD63+SD127+SD191+SD255) of the one entire symbol to become a delay profile are calculated and output as a 1-symbol correlation result (i.e., delay profile).

Where 2-fold oversampling is set, a partial integration result SA0 for the sampling phase A is calculated at clock edge No. 1 and a partial integration result SC0 for the sampling phase C is calculated with a delay of 2 clock cycles, for the first ¼ symbol (in the head search window) on the basis of which a delay profile is to be generated.

Results SA0-SA63 and SC0-SC63 that are output sequentially in the above manner are partial integration results of the first ¼ symbol on the basis of which a delay profile is to be generated, and hence are stored at addresses 0-127 of the RAM unit 105.

Results SA64-SA127 and SC64-SC127 that are output from clock edge No. 257 are partial integration results of the second ¼ symbol on the basis of which a delay profile is to be generated. Therefore, the partial integration results SA0-SA63 and SC0-SC63 of the first ¼ symbol that are stored at addresses 0-127 of the RAM unit 105 are read out, and partial integration results (SA0+SA64) to (SA63+SA127) and (SC0+SC64) to (SC63+SC127) of the first ½ symbol on the basis of which a delay profile is to be generated are calculated and stored at the same addresses of the RAM unit 105.

Results SA128-SA191 and SC128-SC191 that are output from clock edge No. 513 are partial integration results of the third ¼ symbol on the basis of which a delay profile is to be generated. Therefore, the partial integration results (SA0+SA64) to (SA63+SA127) and (SC0+SC64) to (SC63+SC127) of the first ½ symbol that are stored at addresses 0-127 of the RAM unit 105 are read out, and partial integration results (SA0+SA64+SA128) to (SA63+SA127+SA191) and (SC0+SC64+SC128) to (SC63+SC127+SC191) of the first ¾ symbol on the basis of which a delay profile is to be generated are calculated and stored at the same addresses of the RAM unit 105.

Results SA192-SA255 and SC192-SC255 that are output from clock edge No. 769 are partial integration results of the fourth ¼ symbol on the basis of which a delay profile is to be generated. Therefore, the partial integration results (SA0+SA64+SA128) to (SA63+SA127+SA191) and (SC0+SC64+SC128) to (SC63+SC127+SC191) of the first ¾ symbol that are stored at addresses 0-127 of the RAM unit 105 are read out, and partial integration results (SA0+SA64+SA128+SA192) to (SA63+SA127+SA191+SA255) and (SC0+SC64+SC128+SC192) to (SC63+SC127+SC191+SC255) of the one entire symbol to become a delay profile are calculated and output as a 1-symbol correlation result (i.e., delay profile).

Where 1-fold oversampling is set, a partial integration result SA0 of data having the sampling phase A is calculated at clock edge No. 1 for the first ¼ symbol (in the head search window) on the basis of which a delay profile is to be generated.

Results SA0-SA63 that are output sequentially in the above manner are partial integration results of the first ¼ symbol on the basis of which a delay profile is to be generated, and hence are stored at addresses 0-63 of the RAM unit 105.

Results SA64-SA127 that are output from clock edge No. 257 are partial integration results of the second ¼ symbol on the basis of which a delay profile is to be generated. Therefore, the partial integration results SA0-SA63 of the first ¼ symbol that are stored at addresses 0-63 of the RAM unit 105 are read out, and partial integration results (SA0+SA64) to (SA63+SA127) of the first ½ symbol on the basis of which a delay profile is to be generated are calculated and stored at the same addresses of the RAM unit 105.

Results SA128-SA191 that are output from clock edge No. 513 are partial integration results of the third ¼ symbol on the basis of which a delay profile is to be generated. Therefore, the partial integration results (SA0+SA64) to (SA63+SA127) of the first ½ symbol that are stored at addresses 0-63 of the RAM unit 105 are read out, and partial integration results (SA0+SA64+SA128) to (SA63+SA127+SA191) of the first ¾ symbol on the basis of which a delay profile is to be generated are calculated and stored at the same addresses of the RAM unit 105.

Results SA192-SA255 that are output from clock edge No. 769 are partial integration results of the fourth ¼ symbol on the basis of which a delay profile is to be generated. Therefore, the partial integration results (SA0+SA64+SA128) to (SA63+SA127+SA191) of the first ¾ symbol that are stored at addresses 0-63 of the RAM unit 105 are read out, and partial integration results (SA0+SA64+SA128+SA192) to (SA63+SA127+SA191+SA255) of the one entire symbol to become a delay profile are calculated and output as a 1-symbol correlation result (i.e., delay profile).

The point to which attention should be paid in the above processing is that in every kind of oversampling setting the length of reception data that can be captured by the data shift register unit 101 of the matched filter circuit 100 is fixed to the ¼-symbol length.

In the above conventional matched filter circuit 100, to switch the sampling accuracy of data to be received, as the oversampling setting number is switched in order of 4, 2, and 1 the operation speed of the matched filter circuit 100 is lowered so as to conform to the rate of reception data.

More specifically, let H represent an operation speed at which the matched filter circuit 100 needs to operate when 4-fold oversampling is set; then, the matched filter circuit 100 needs to operate at operation speeds H/2 and H/4 when 2-fold oversampling and 1-fold oversampling are set, respectively.

Further, in conventional 1-symbol integration time-divisional matched filter circuits, the search window width decreases at the same rate as the number of taps decreases, which is in contrast to matched filter circuits in which 1-symbol integration is performed at once.

SUMMARY OF THE INVENTION

The present invention has been made to solve the above problems in the art, and an object of the invention is therefore to provide a matched filter circuit that is higher in circuit utilization efficiency and lower in power consumption than conventional circuits because the search window can be set wider by fully utilizing its circuit resources when the oversampling setting number is low, as well as a correlation calculation method therefor.

A first form of the matched filter circuit according to the invention is a matched filter circuit which receives reception data and spreading codes externally and operates according to external oversampling setting, comprising:

first data shift register means for receiving the reception data and for storing and shifting data having a prescribed oversampling phase; first data input route selecting means for selecting the reception data or a shift output of a final stage of the first data shift register means in accordance with the oversampling setting; second data shift register means for receiving an output of the first data input route selecting means and for storing and shifting data having a prescribed oversampling phase; second data input route selecting means for selecting the reception data or a shift output of a final stage of the second data shift register means in accordance with the oversampling setting; third data shift register means for receiving an output of the second data input route selecting means and for storing and shifting data having a prescribed oversampling phase; third data input route selecting means for selecting the reception data or a shift output of a final stage of the third data shift register means in accordance with the oversampling setting; and fourth data shift register means for receiving an output of the third data input route selecting means and for storing and shifting data having a prescribed oversampling phase;

first code shift register means for receiving the spreading codes and for storing and shifting spreading codes corresponding to the first data shift register means; first code input route selecting means for selecting the spreading codes or a shift output of a final stage of the first code shift register means in accordance with the oversampling setting; second code shift register means for receiving an output of the first code input route selecting means and for storing and shifting spreading codes corresponding to the second data shift register means; second code input route selecting means for selecting the spreading codes or a shift output of a final stage of the second code shift register means in accordance with the oversampling setting; third code shift register means for receiving an output of the second code input route selecting means and for storing and shifting spreading codes corresponding to the third data shift register means; third code input route selecting means for selecting the spreading codes or a shift output of a final stage of the third code shift register means in accordance with the oversampling setting; and fourth code shift register means for receiving an output of the third code input route selecting means and for storing and shifting spreading codes corresponding to the fourth data shift register means;

first despreading integration calculating means for performing despreading calculation and integration calculation using outputs of the first data shift register means and outputs of the first code shift register means; second despreading integration calculating means for performing despreading calculation and integration calculation using outputs of the second data shift register means and outputs of the second code shift register means; third despreading integration calculating means for performing despreading calculation and integration calculation using outputs of the third data shift register means and outputs of the third code shift register means; and fourth despreading integration calculating means for performing despreading calculation and integration calculation using outputs of the fourth data shift register means and outputs of the fourth code shift register means;

first adding means for adding together an output of the first despreading integration calculating means and an output of the second despreading integration calculating means; second adding means for adding together an output of the third despreading integration calculating means and an output of the fourth despreading integration calculating means; and third adding means for adding together an output of the first adding means and an output of the second adding means;

cumulative addition means for receiving an output of the first despreading integration calculating means, an output of the second despreading integration calculating means, an output of the third despreading integration calculating means, an output of the fourth despreading integration calculating means, an output of the first adding means, an output of the second adding means, and an output of the third adding means, and for performing cumulative addition in accordance with the oversampling setting; and storing means for temporarily storing cumulative addition data that are output from the cumulative addition means.

In the matched filter circuit having the above configuration, data are input to and shifted by each data shift register means and spreading codes suitable for the oversampling setting are input to and shifted by each code shift register means. Therefore, when the oversampling setting number is low, the number of taps can be increased by fully utilizing the circuit resources and hence the search window can be set wider. Further, since the configuration is such as to prevent an event that all the data shift register means perform shift operations simultaneously, the power consumption can be reduced.

A second form of the matched filter circuit according to the invention is a matched filter circuit which receives reception data and spreading codes externally and operates according to external oversampling setting, comprising N data shift register means for receiving the reception data and for storing and shifting data having prescribed oversampling phases, N being a natural number that is greater than or equal to 2; N−1 data input route selecting means each for selecting the reception data or a shift output of a final stage of immediately preceding data shift register means in accordance with the oversampling setting, and for outputting the selected reception data or shift output to immediately following data shift register means; N code shift register means for receiving the spreading codes and for storing and shifting spreading codes corresponding to the associated data shift register means, respectively; N−1 code input route selecting means each for selecting the spreading codes or a shift output of a final stage of immediately preceding code shift register means in accordance with the oversampling setting, and for outputting the selected spreading codes or shift output to immediately following code shift register means; N despreading integration calculating means for performing despreading and integration calculation using outputs of the data shift register means and outputs of the code shift register means; N−1 adding means for adding together outputs of the despreading integration calculating means; cumulative addition means for receiving outputs of the despreading integration calculating means and outputs of the adding means and for performing cumulative addition in accordance with the oversampling setting; and storing means for temporarily storing cumulative addition data that are output from the cumulative addition means.

The matched filter circuit having the above configuration makes it possible to construct a matched filter circuit that enables up to N-fold oversampling setting and provides the same advantages as the first form of matched filter circuit does.

A third form of the matched filter circuit according to the invention is such that the data shift register means and the code shift register means are each controlled divisionally in groups of a number that is equal to an oversampling setting number; that each of the data input route selecting means selects the reception data if it immediately precedes head data shift register means of a group, and selects the reception data or a shift output of the final stage of the immediately preceding data shift register means if it does not immediately precede head data shift register means of a group; that each of the code input route selecting means selects the spreading codes if it immediately precedes head code shift register means of a group, and selects the spreading codes or a shift output of the final stage of the immediately preceding code shift register if it does not immediately precede head code shift register means; and that reception data having different oversampling phases are shift-input to the data shift register means of the respective groups, and spreading codes corresponding to the associated data shift register means are shift-input to the respective code shift register means on a group-by-group basis.

In the matched filter circuit having the above configuration, data are input to and shifted by each data shift register means and spreading codes suitable for the oversampling setting are input to and shifted by each code shift register means. Therefore, when the oversampling setting number is low, the despreading calculation and the integration calculation can be performed with an increased number of taps by fully utilizing the circuit resources and hence the search window can be set wider. The width of search windows to be used for producing a delay profile can be varied effectively in accordance with the oversampling setting number.

A forth form of the matched filter circuit according to the invention is such that the data shift register means and the code shift register means are each controlled divisionally in groups of a number that is equal to an oversampling setting number; that each of the data input route selecting means selects the reception data and each of the code input route selecting means selects the spreading codes; and that reception data having different oversampling phases are input to the data shift register means of the respective groups so as to be assigned cyclically to the data shift register means of each group, and spreading codes corresponding to the associated data shift register means are input to the respective code shift register means on a group-by-group basis so as to be assigned cyclically to the code shift register means of each group.

In the matched filter circuit having the above configuration, reception data having different oversampling phases are input to the data shift register means of the respective groups so as to be assigned cyclically to the data shift register means of each group, and spreading codes corresponding to the associated data shift register means are input to the respective code shift register means on a group-by-group basis so as to be assigned cyclically to the code shift register means of each group. Therefore, reception data and spreading codes can be shifted independently in the groups. When the oversampling setting number is low, the number of registers where shifts occur at a certain instant is made 1/(oversampling setting number) of that in the case of a maximum oversampling setting number. This allows the matched filter circuit to operate with a lower power consumption than the third form of matched filter circuit does.

A fifth form of the matched filter circuit according to the invention is such that, in the first or second form of matched filter circuit, the data shift register means are controlled divisionally in groups of a number that is equal to a maximum oversampling setting number, and clock signals having different phases are applied to the data shift register means of the respective groups.

In the matched filter circuit having the above configuration, since dedicated clock signals having different phases are applied to the data shift register means of the respective groups, it is possible to halt the clock signals while the data are held by the data shift register means. This enables further reduction in power consumption.

A sixth form of the matched filter circuit according to the invention is a matched filter circuit which receives reception data and spreading codes externally and operates according to external oversampling setting, comprising N data shift register means for receiving the reception data and for storing and shifting data having prescribed oversampling phases, N being a natural number that is greater than or equal to 2; N code shift register means for receiving the spreading codes and for storing and shifting spreading codes corresponding to the associated data shift register means, respectively; N despreading integration calculating means for performing despreading and integration calculation using outputs of the data shift register means and outputs of the code shift register means; N−1 adding means for adding together outputs of the despreading integration calculating means; cumulative addition means for receiving outputs of the despreading integration calculating means and outputs of the adding means and for performing cumulative addition in accordance with the oversampling setting; and storing means for temporarily storing cumulative addition data that are output from the cumulative addition means, wherein the N data shift register means and the N code shift register means are each controlled divisionally in groups of a number that is equal to an oversampling setting number; and wherein reception data having different oversampling phases are input to the data shift register means of the respective groups so as to be assigned cyclically to the data shift register means of each group, and spreading codes corresponding to the associated data shift register means are input to the respective code shift register means on a group-by-group basis so as to be assigned cyclically to the code shift register means of each group.

In the matched filter circuit having the above configuration, since external inputs can directly be supplied to the data shift register means and the code shift register means, the number of shift registers where shifts occur simultaneously can be reduced. This enables further reduction in power consumption.

A first form of the correlation calculation method according to the invention is a correlation calculation method for oversampled data and codes using a matched filter circuit having a plurality of data shift register means and a plurality of code shift register means, comprising the steps of dividing the data shift register means and the code shift register means into groups of a number that is equal to an oversampling setting number; and performing correlation calculation while shift-inputting data having different oversampling phases to the data register means of the respective groups and shift-inputting codes corresponding to the associated data shift register means into the respective code shift register means on a group-by-group basis.

In the correlation calculation method having the above constitution, data are input to and shifted by each data shift register means and spreading codes suitable for the oversampling setting are input to and shifted by each code shift register means. Therefore, when the oversampling setting number is low, the correlation calculation can be performed with an increased number of taps by fully utilizing the circuit resources and hence the search window can be set wider. The width of search windows to be used for producing a delay profile can be varied effectively in accordance with the oversampling setting number.

A second form of the correlation calculation method according to the invention is a correlation calculation method for oversampled data and codes using a matched filter circuit having a plurality of data shift register means and a plurality of code shift register means, comprising the steps of dividing the data shift register means and the code shift register means into groups of a number that is equal to an oversampling setting number; and performing correlation calculation while inputting data having different oversampling phases to the data register means of the respective groups in such a manner that the data are assigned cyclically to the data register means of each group and inputting codes corresponding to the associated data shift register means into the respective code shift register means on a group-by-group basis in such a manner that the codes are assigned cyclically to the code shift register means of each group.

In the correlation calculation method having the above constitution, reception data having different oversampling phases are input to the data shift register means of the respective groups so as to be assigned cyclically to the data shift register means of each group, and spreading codes corresponding to the associated data shift register means are input to the respective code shift register means on a group-by-group basis so as to be assigned cyclically to the code shift register means of each group. Therefore, reception data and spreading codes can be shifted independently in the groups. When the oversampling setting number is low, the number of registers where shifts occur at a certain instant is made 1/(oversampling setting number) of that in the case of a maximum oversampling setting number. The power consumption can be made lower than in the case of the first form of method.

According to the invention, the data shift register means and the code shift register means are controlled divisionally in groups of a number that is equal to the oversampling setting number and data having different oversampling phases are input to and shifted by the respective groups. Therefore, when the oversampling setting number is low, the number of taps can be increased by fully utilizing the circuit resources and hence the search window can be set wider. And it becomes possible to realize, more flexibly, functions that are required by a system.

Further, according to the invention, since the power consumption can be reduced by decreasing the number of shift registers where shifts occur simultaneously, the power consumption of a system can also be reduced. In the case of a terminal apparatus, the battery driving time can be elongated further. In the case of a base station apparatus, the power consumption of the entire system in which channels are implemented at a high integration density can be reduced.

DESCRIPTION OF THE PREFERRED EMBODIMENTS

The best mode for carrying out the present invention will be hereinafter described with reference to the drawings. In the following description, it is assumed that one symbol consists of 256 chips, the number of taps is equal to 64 (a 1-symbol integration time is divided into four intervals), and the oversampling setting number is 4, 2, or 1. The sampling phases of data that are input to a matched filter circuit are denoted by characters A, B, C, and D in the case of 4-fold oversampling setting, by characters A and C in the case of 2-fold oversampling setting, and by character A in the case of 1-fold oversampling setting.

Embodiment 1

Figure 7:
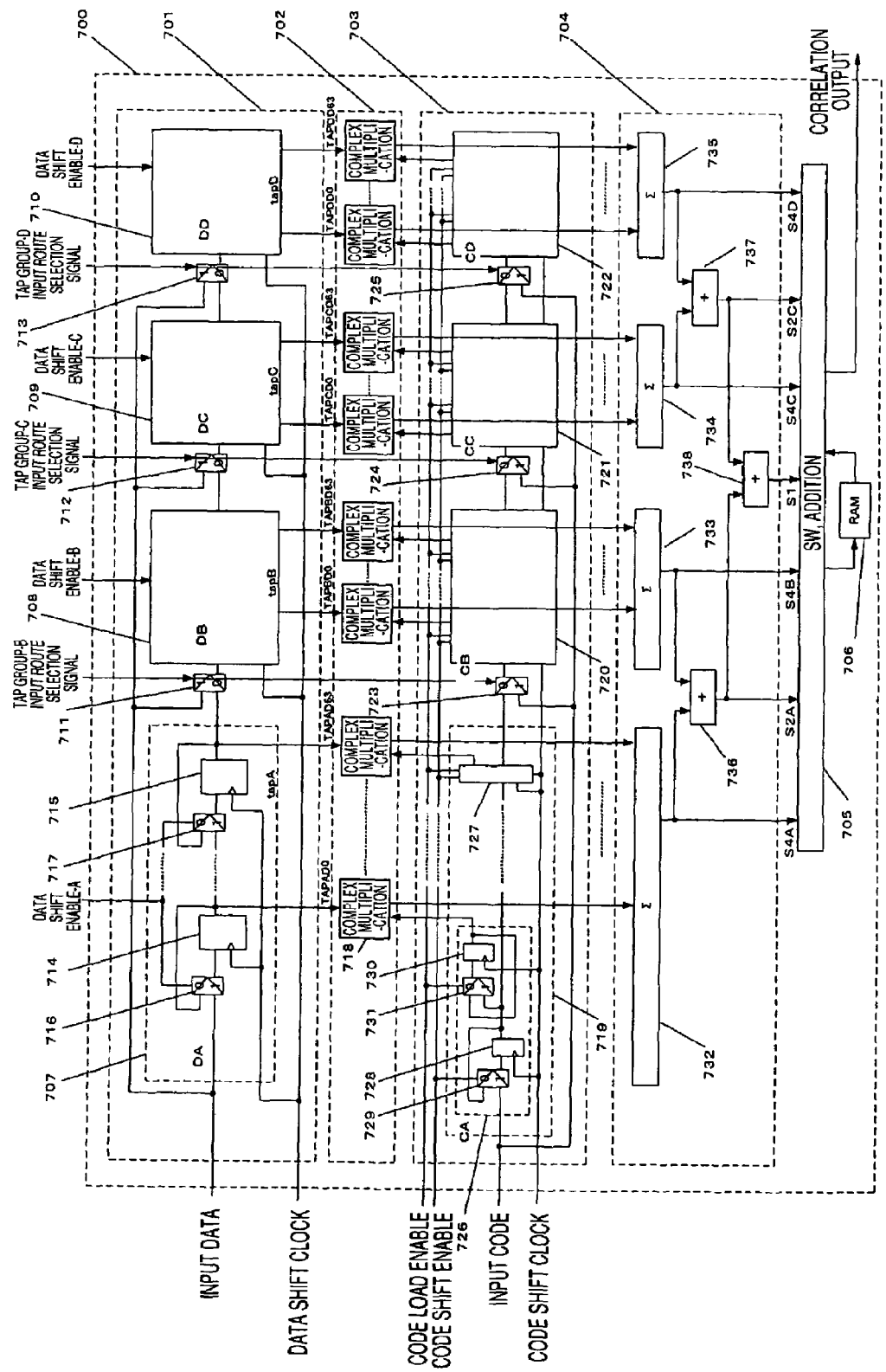
FIG. 7 is a block diagram showing the configuration of a matched filter circuit according to a first embodiment of the present invention.

FIG. 7 is a block diagram showing the configuration of a matched filter circuit according to a first embodiment of the invention. As shown in FIG. 7, the matched filter circuit 700 is composed of a data shift register unit 701 that stores and shifts data of two systems (i.e., I and Q channels), a complex multiplication unit 702 that despreads the data of the two systems (i.e., I and Q channels) by complex multiplication, a code shift register unit 703 that shifts and stores replica codes of the two systems (i.e., I and Q channels) that are necessary for the despreading, an integration block 704 that adds up despread correlation data of respective chips and outputs results from output terminals corresponding to the oversampling setting number, a cumulative addition unit 705 that changes the data processing route in accordance with the oversampling setting and cumulatively adds results of 1-symbol integration, 4-time-divisional processing, and a RAM unit 706 that stores a result of the 1-symbol integration, 4-time-divisional processing.

Although as described above the data shift register unit 701, the complex multiplication unit 702, the code shift register unit 703, the integration block 704, the cumulative addition unit 705, and the RAM unit 706 process data of the two systems (i.e., I and Q channels), only the processing for one channel will be described below to simplify the description.

The data shift register unit 701 is composed of a data tap group-A unit 707, a data tap group-B unit 708, a data tap group-C unit 709, a data tap group-D unit 710, a data tap group-B input route selection circuit 711, a data tap group-C input route selection circuit 712, and a data tap group-D input route selection circuit 713.

The data tap group-B input route selection circuit 711 selects, as an input to the data tap group-B unit 708, an output of the data tap group-A unit 707 or input data to the data shift register unit 701 in accordance with a tap group-B input route selection signal. The data tap group-C input route selection circuit 712 selects, as an input to the data tap group-C unit 709, an output of the data tap group-B unit 708 or the input data to the data shift register unit 701 in accordance with a tap group-C input route selection signal. The data tap group-D input route selection circuit 713 selects, as an input to the data tap group-D unit 710, an output of the data tap group-C unit 709 or the input data to the data shift register unit 701 in accordance with a tap group-D input route selection signal.

The data tap group-A unit 707 is composed of data register circuits 714, 715, . . . that shift and store data that are input from a data input terminal and register data hold/shift selection circuits 716, 717, . . . that hold or shift the data stored in the data register circuits 714, 715, . . . , respectively, in accordance with a data shift enable-A signal that is supplied externally.

The data register circuit 714 and the register data hold/shift selection circuit 716 correspond to the first one of 64 taps that are connected to the data input terminal and have a shift register structure, and the data register circuit 715 and the register data hold/shift selection circuit 717 correspond to the 64th one of the 64 taps.

Outputs of the first to 64th data register circuits 714, 715, . . . , which are connected to the data input terminal and have a shift register structure, are data stored in the respective taps.

The data tap group-B unit 708, the data tap group-C unit 709, and the data tap group-D unit 710 are configured in the same manner as the data tap group-A unit 707.

Incorporating complex multiplication circuits 718 of 256 taps, the complex multiplication unit 702 performs despreading through complex multiplication of 256 taps using outputs of the data register circuits 701 (i.e., outputs of the data tap group-A unit 707, the data tap group-B unit 708, the data tap group-C unit 709, and the data tap group-D unit 710) of 256 taps in total and replica codes of 256 taps (described later).

Configured analogously to the code shift register unit 701, the data shift register unit 703 is composed of a code tap group-A unit 719, a code tap group-B unit 720, a code tap group-C unit 721, and a code tap group-D unit 722, a code tap group-B input route selection circuit 723, a code tap group-C input route selection circuit 724, and a code tap group-D input route selection circuit 725.

The code tap group-B input route selection circuit 723 selects, as an input to the code tap group-B unit 720, an output of the code tap group-A unit 719 or an input code to the code shift register unit 703 in accordance with a tap group-B input route selection signal. The code tap group-C input route selection circuit 724 selects, as an input to the code tap group-C unit 721, an output of the code tap group-B unit 720 or the input code to the code shift register unit 703 in accordance with a tap group-C input route selection signal. The code tap group-D input route selection circuit 725 selects, as an input to the code tap group-D unit 722, an output of the code tap group-C unit 721 or the input code to the code shift register unit 703 in accordance with a tap group-D input route selection signal.

The code tap group-A unit 719 is composed of code register units 726, 727, . . . that shift, serial/parallel-convert, and store replica codes that are input from a code input terminal. The code register unit 726 corresponds to the first one of 64 taps that are connected to the code input terminal and have a shift register structure, and the code register unit 727 corresponds to the 64th one of the 64 taps.

Outputs of the first to 64th code register units 726, 727, . . . , which are connected to the code input terminal and have a shift register structure, serve as codes that are stored and held in the respective taps.

The code tap group-B unit 720, the code tap group-C unit 721, and the code tap group-D unit 722 are configured in the same manner as the code tap group-A unit 719.

The code register unit 726 is composed of a code shift register circuit 728 that shifts and stores a replica code that is input from the code input terminal, a code hold/shift selection circuit 729 that holds or shifts the code stored in the code shift register circuit 728 in accordance with a code shift enable signal that is supplied externally, a code holding register circuit 730 that serial/parallel-converts the serial code of the code shift register circuit 728 and holds a result, and a code hold/update selection circuit 731 that switches between holding and updating of the code holding register circuit 730 in accordance with a code load enable signal that is supplied externally.

The integration block 704 is composed of a tap group-A integration block 732 that integrates complex multiplication results of 64 taps (tap group-A unit) that are output from the 7 complex multiplication unit 702 and outputs a result, a tap group-B integration block 733 that integrates complex multiplication results of 64 taps (tap group-B unit) and outputs a result, a tap group-C integration block 734 that integrates complex multiplication results of 64 taps (tap group-C unit) and outputs a result, a tap group-D integration block 735 that integrates complex multiplication results of 64 taps (tap group-D unit) and outputs a result, a tap group-A/B addition circuit 736 that adds together the integration results of the tap group-A integration block 732 and the tap group-B integration block 733 and outputs a result, a tap group-C/D addition circuit 737 that adds together the integration results of the tap group-C integration block 734 and the tap group-D integration block 735 and outputs a result, and a tap group-A/B/C/D addition circuit 738 that adds together the integration results of the tap group-A/B addition circuit 736 and the tap group-C/D addition circuit 737 and outputs a result.

The integration block 704 outputs the result of the tap group-A integration block 732 from an S4A terminal as a partial integration result for the sampling phase A of 4-fold oversampling, outputs the result of the tap group-B integration block 733 from an S4B terminal as a partial integration result for the sampling phase B of 4-fold oversampling, outputs the result of the tap group-C integration block 734 from an S4C terminal as a partial integration result for the sampling phase C of 4-fold oversampling, and outputs the result of the tap group-D integration block 735 from an S4D terminal as a partial integration result of a sampling phase D of 4-fold oversampling. Further, by adding together the results of the tap group-A integration blocks 732-735 in a knockout-tournament-like manner, the integration block 704 outputs the result of the tap group-A/B addition circuit 736 from an S2A terminal as a partial integration result for the sampling phase A (or B) of 2-fold oversampling, outputs the result of the tap group-C/D addition circuit 737 from an S2C terminal as a partial integration result for the sampling phase C (or D) of 2-fold oversampling, and outputs the result of the tap group-A/B/C/D addition circuit 738 from an S1 terminal as an integration result for the sampling phase A (or B, C, or D) of 1-fold oversampling.

Figure 8:
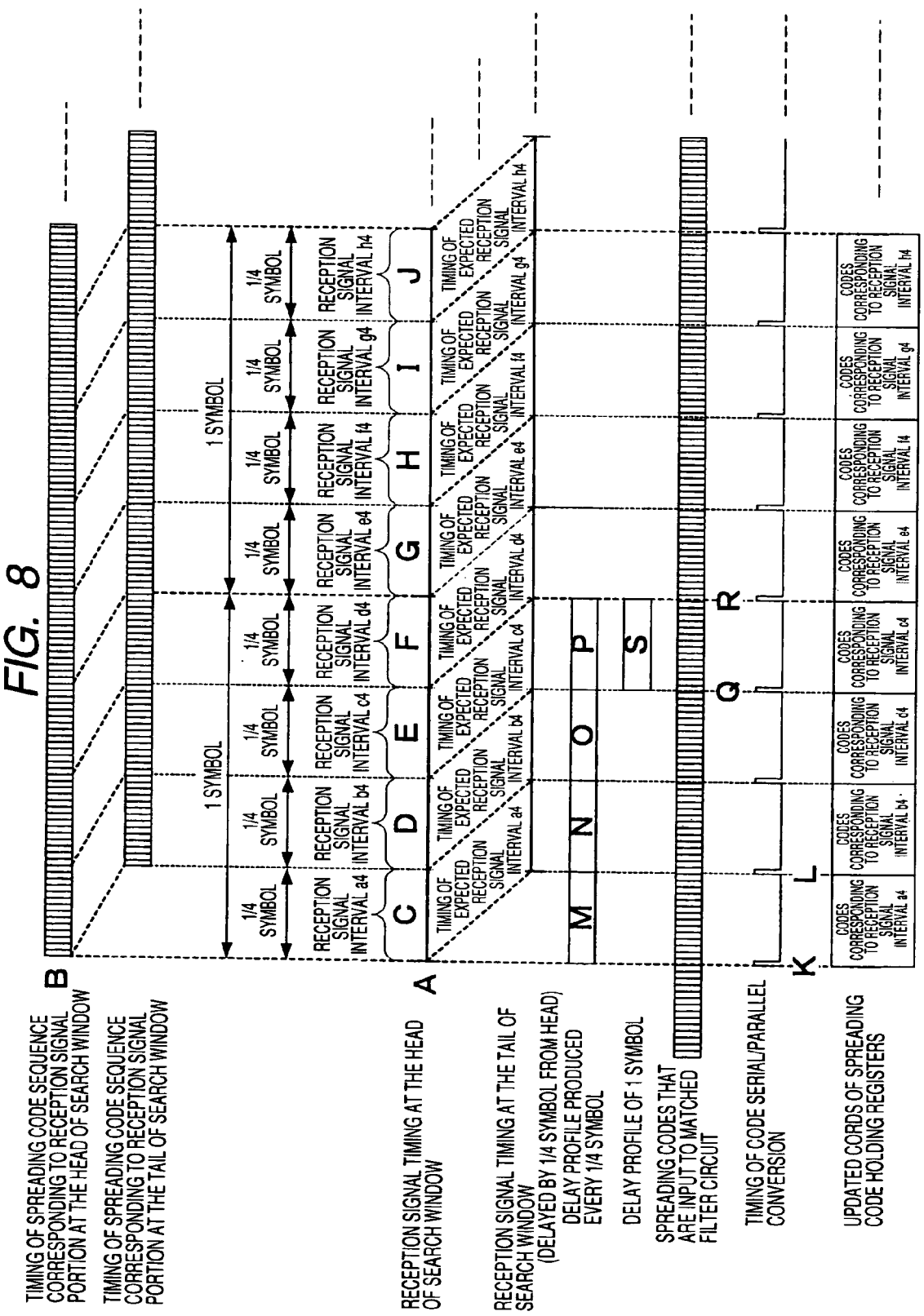
FIG. 8 is a timing chart showing processing and a search window width of the matched filter circuit according to the first embodiment of the invention in a state that 4-fold oversampling is set.
Figure 9:
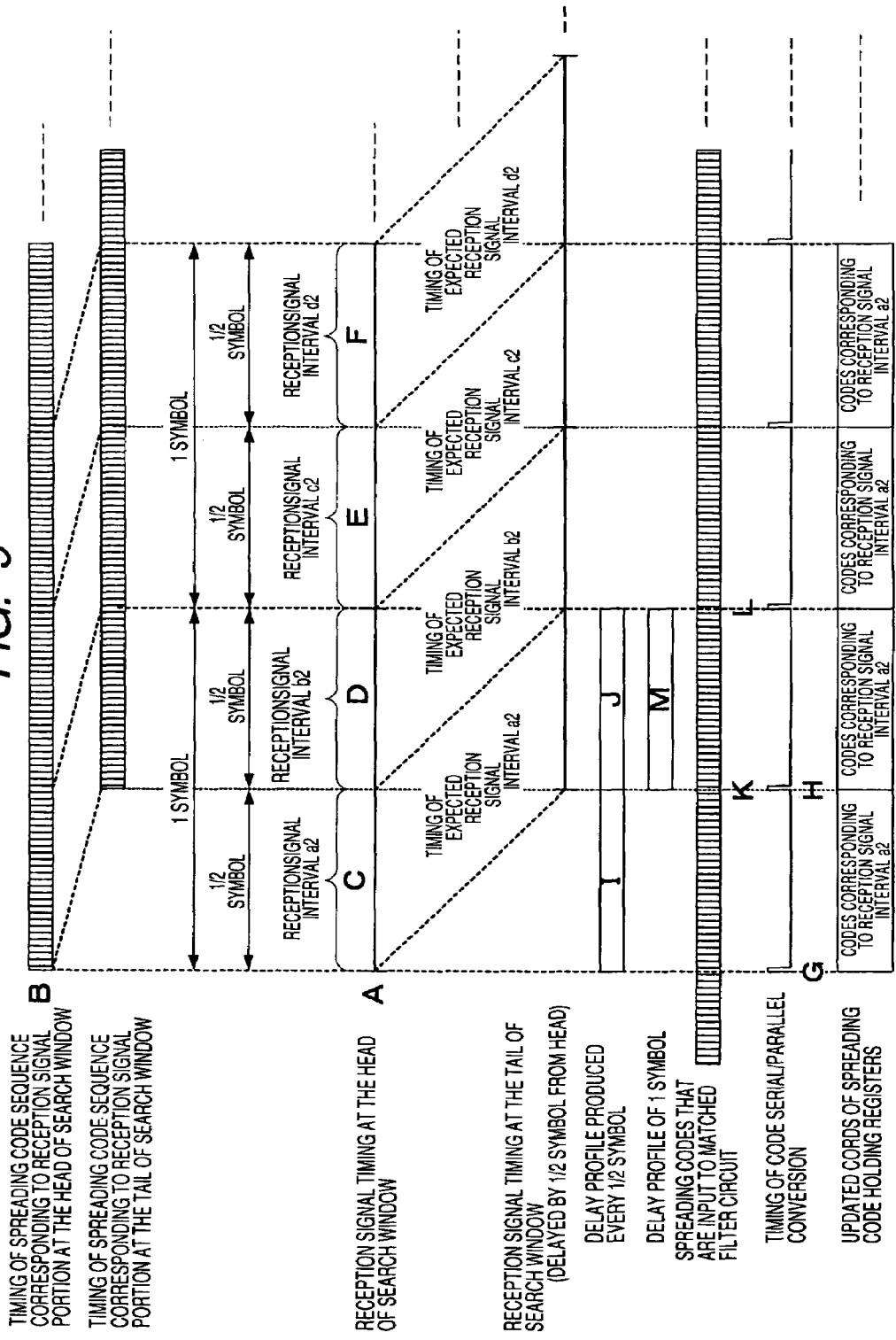
FIG. 9 is a timing chart showing processing and a search window width of the matched filter circuit according to the first embodiment of the invention in a state that 2-fold oversampling is set.
Figure 10:
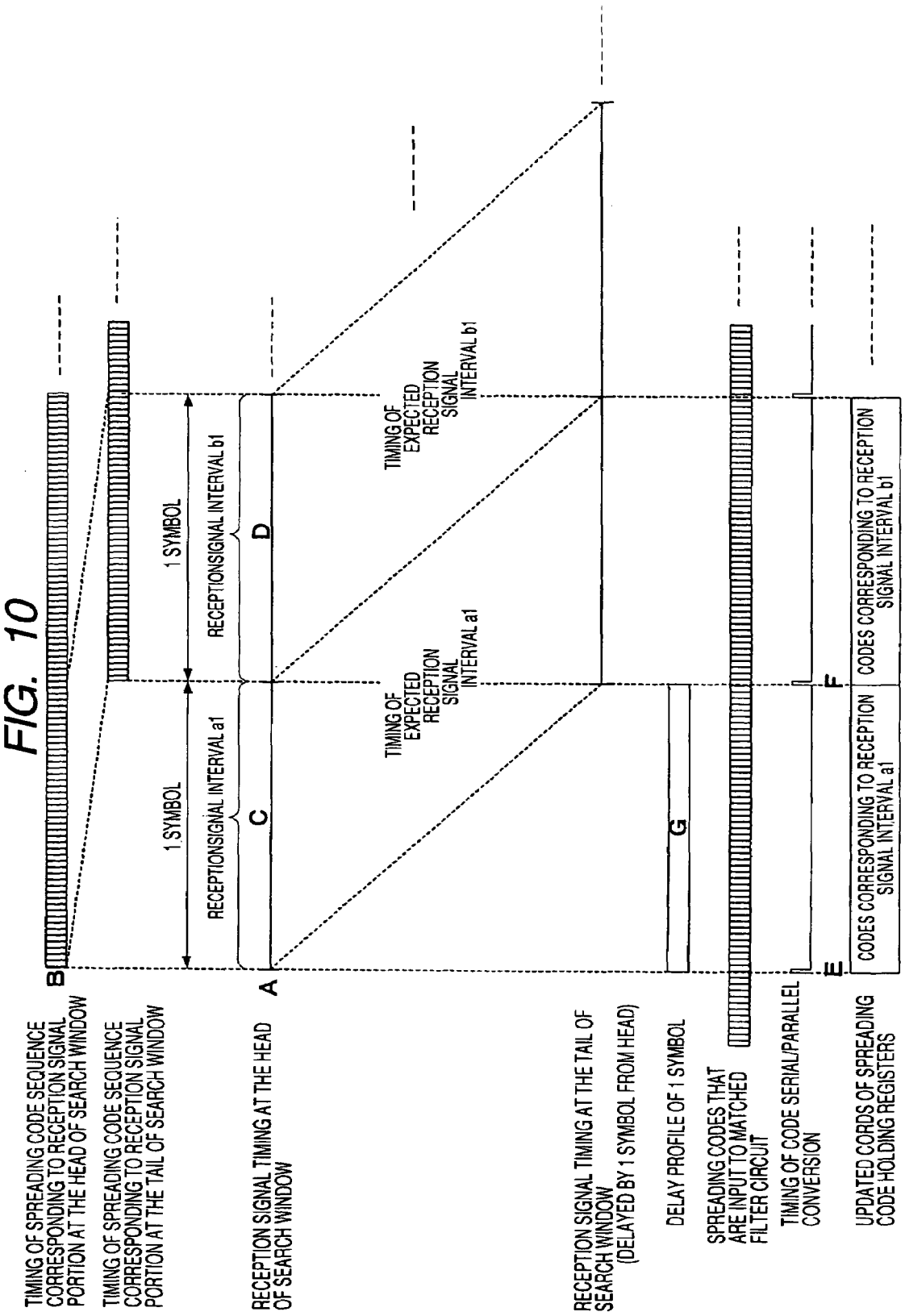
FIG. 10 is a timing chart showing processing and a search window width of the matched filter circuit according to the first embodiment of the invention in a state that 1-fold oversampling is set.

Next, the operation of the matched filter according to this embodiment will be outlined with reference to FIGS. 8-10. Each of FIGS. 8-10 is a timing chart showing the processing and a search window width of the operation of the matched filter according to this embodiment in a state that each kind of oversampling is set.

FIG. 8 shows processing that is performed when 4-fold oversampling is set. In FIG. 8, character A denotes timing of a reception signal portion at the head of a search window that comes earliest among reception signal portions to be subjected to the despreading. Character B denotes replica codes that are necessary for despreading the reception signal and that are arranged on the time axis so as to correspond to the reception signal portion at the head of the search window.

Characters C, D, E, F, G, H, I, and J denote data processing units in a state that a one-round sequence of 4-fold oversampling data to be received has been captured by the matched filter circuit 700. Each data processing unit has a ¼-symbol length. Therefore, where 4-fold oversampling is set, to generate a delay profile by processing a 1-symbol portion of the reception signal, it is necessary to perform time-divisional processing four times (C, D, E, and F).

Processing of one time that is performed on ¼-symbol reception data by the matched filter circuit 700 according to the embodiment will be described below together with details of replica codes that are necessary for the processing.

To generate delay profile data for reception data in a reception signal interval a4, first, replica codes to be used for despreading are input to the code shift register unit 703 of the matched filter circuit 700 by timing K. The replica codes are serial/parallel-converted at timing K and resulting codes are held until timing L by the code holding register circuits 730 of all taps of each tap group. Fixed replica codes are output to all taps of the complex multiplication unit 702.

A ¼-symbol delay profile M is calculated by shifting the reception data in the data shift register unit 701 until timing L in this state. Likewise, ¼-symbol delay profiles N, O, and P are calculated. A 1-symbol delay profile S obtained by cumulative addition is output from timing Q to timing R.

An important thing is that since the length of a reception signal interval that can be set at each moment in the data shift register unit 701 in the case of the 4-fold oversampling setting is equal to the ¼-symbol length, it is necessary to set codes for a reception signal portion in the next interval b4 and calculates a delay profile N immediately after calculation of a delay profile M of the reception signal interval a4 (C). Therefore, where 4-fold oversampling is set, the search window width is made equal to the ¼-symbol length.

FIG. 9 shows processing that is performed when 2-fold oversampling is set. In FIG. 9, character A denotes timing of a reception signal portion at the head of a search window that comes earliest among reception signal portions to be subjected to the despreading. Character B denotes replica codes that are necessary for despreading the reception signal and that are arranged on the time axis so as to correspond to the reception signal portion at the head of the search window.

Characters C, D, E, and F denote data processing units in a state that a one-round sequence of 2-fold oversampling data to be received has been captured by the matched filter circuit 700. Each data processing unit has a ½-symbol length. Therefore, where 2-fold oversampling is set, to generate a delay profile by processing a 1-symbol portion of the reception signal, it is necessary to perform time-divisional processing two times (C, and D).

Processing of one time that is performed on ½-symbol reception data by the matched filter circuit 700 according to the embodiment will be described below together with details of replica codes that are necessary for the processing.

To generate delay profile data for reception data in a reception signal interval a2, first, replica codes to be used for despreading are input to the code shift register unit 703 of the matched filter circuit 700 by timing G. The replica codes are serial/parallel-converted at timing G and resulting codes are held until timing H by the code holding register circuits 730 of all taps of each tap group. Fixed replica codes are output to all taps of the complex multiplication unit 702.

A ½-symbol delay profile I is calculated by shifting the reception data in the data shift register unit 701 until timing H in this state. Likewise, a ½-symbol delay profile J is calculated. A 1-symbol delay profile M obtained by cumulative addition is output from timing K to timing L.

An important thing is that since the length of a reception signal interval that can be set at each moment in the data shift register unit 701 in the case of the 2-fold oversampling setting is equal to the ½-symbol length, it is necessary to set codes for a reception signal portion in the next interval b2 and calculates a delay profile J immediately after calculation of a delay profile I of the reception signal interval a2 (C). Therefore, where 2-fold oversampling is set, the search window width is made equal to the ½-symbol length.

FIG. 10 shows processing that is performed when 1-fold oversampling is set. In FIG. 10, character A denotes timing of a reception signal portion at the head of a search window that comes earliest among reception signal portions to be subjected to the despreading. Character B denotes replica codes that are necessary for despreading the reception signal and that are arranged on the time axis so as to correspond to the reception signal portion at the head of the search window.

Characters C and D denote data processing units in a state that a one-round sequence of 1-fold oversampling data to be received has been captured by the matched filter circuit 700 according to the embodiment Each data processing unit has a 1-symbol length. Therefore, where 1-fold oversampling is set, a delay profile can be generated by performing time-divisional processing one time (C) on a 1-symbol portion of the reception signal.

Processing of one time that is performed on 1-symbol reception data by the matched filter circuit 700 according to the embodiment will be described below together with details of replica codes that are necessary for the processing.

To generate delay profile data for reception data in a reception signal interval a1, first, replica codes to be used for despreading are input to the code shift register unit 703 of the matched filter circuit 700 by timing E. The replica codes are serial/parallel-converted at timing E and resulting codes are held until timing F by the code holding register circuits 730 of all taps of each tap group. Fixed replica codes are output to all taps of the complex multiplication unit 702.

A 1-symbol delay profile G is calculated by shifting the reception data in the data shift register unit 701 until timing F in this state.

An important thing is that since the length of a reception signal interval that can be set at each moment in the data shift register unit 701 in the case of the 1-fold oversampling setting is equal to the 1-symbol length, it is necessary to set codes for a reception signal portion in the next interval b1 and calculates a delay profile J immediately after calculation of a delay profile G oof the reception signal interval a1 (C). Therefore, where 1-fold oversampling is set, the search window width is made equal to the 1-symbol length.

Next, a flow of generation of a delay profile by the matched filter circuit 700 according to the embodiment will be described with reference to FIGS. 11-15.

Figure 11:
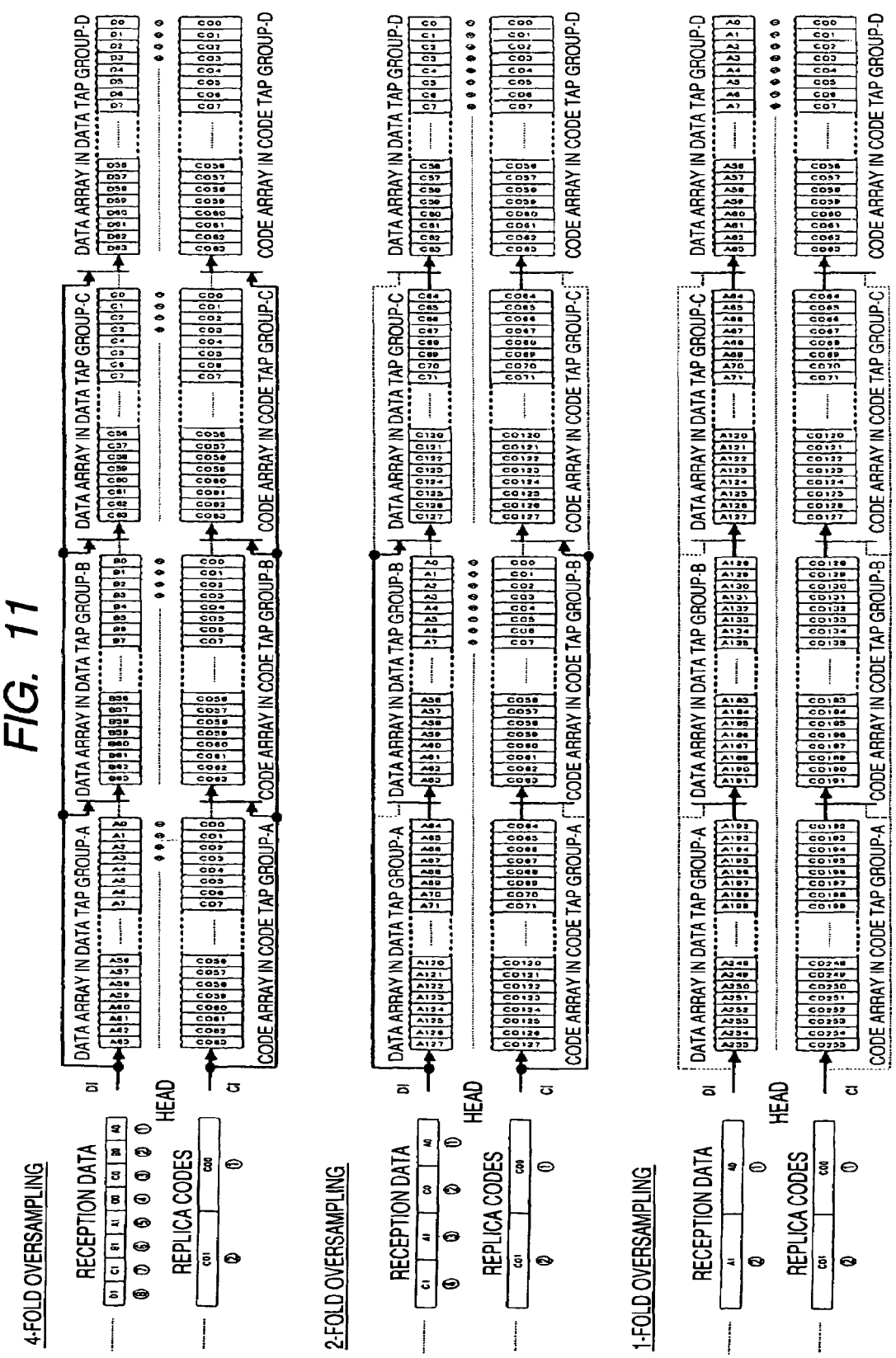
FIG. 11 shows methods for shifting data and replica codes in the matched filter circuit according to the first embodiment of the invention in the case of each kind of oversampling setting.

FIG. 11 shows methods for shifting data and replica codes in the matched filter circuit 700 in the case of the 4-fold, 2-fold, and 1-fold oversampling setting, respectively. The left part of FIG. 11 shows reception data and replica codes that are received in the case of each kind of oversampling setting, and the right part shows routes of the reception data and the replica codes that are selected in the case of each kind of oversampling setting and how one-round sequences of reception data and replica codes are stored in the registers.

Where 4-fold oversampling is set, routes to the inputs of the data tap group-A to D are selected so that all the data are supplied to those inputs from a D1 input terminal and routes to the inputs of the code tap group-A to D are selected so that all the replica codes are supplied to those inputs from a CI input terminal.

Therefore, the reception data are input in order of A0, B0, C0, D0, A1, B1, . . . . And a replica code C00 corresponds to the reception data (A0, B0, C0, D0), a replica code C01 corresponds to the reception data (A1, B1, C1, D1), and so forth.

As a result, the reception data having the sampling phase A and the corresponding replica codes are assigned to the data tap group-A and the code tap group-A, respectively. The reception data having the sampling phase B and the corresponding replica codes are assigned to the data tap group-B and the code tap group-B, respectively. The reception data having the sampling phase C and the corresponding replica codes are assigned to the data tap group-C and the code tap group-C, respectively. The reception data having the sampling phase D and the corresponding replica codes are assigned to the data tap group-D and the code tap group-D, respectively. The reception data that are stored in the registers of each data tap group have a ¼-symbol length.

Where 2-fold oversampling is set, routes to the inputs of the data tap group-A and C are selected so that data are supplied to those inputs from the DI input terminal and routes to the inputs of the code tap group-A and C are selected so that replica codes are supplied to those inputs from the CI input terminal. A route to the input of the data tap group-B is selected so that data are supplied to this input from the output of the data tap group-A, and a route to the input of the code tap group-B is selected so that replica codes are supplied to this input from the output of the code tap group-A. A route to the input of the data tap group-D is selected so that data are supplied to this input from the output of the data tap group-B, and a route to the input of the code tap group-D is selected so that replica codes are supplied to this input from the output of the code tap group-B.

Therefore, the reception data are input in order of A0, C0, A1, C1, A2, C2, . . . . And a replica code C00 corresponds to the reception data (A0, C0), a replica code C01 corresponds to the reception data (A1, C1), and so forth.

As a result, the reception data having the sampling phase A and the corresponding replica codes are assigned to the data tap group-A and B and the code tap group-A and B, respectively. The reception data having the sampling phase C and the corresponding replica codes are assigned to the data tap group-C and D and the code tap group-C and D, respectively. The reception data that are stored in the registers of each data tap group have a ½-symbol length.

Where 1-fold oversampling is set, a route to the input of the data tap group-A is selected so that data are supplied to this input from the D1 input terminal and a route to the input of the code tap group-A is selected so that replica codes are supplied to this input from the CI input terminal. A route to the input of the data tap group-D is selected so that data are supplied to this input from the output of the data tap group-C, and a route to the input of the code tap group-D is selected so that replica codes are supplied to this input from the output of the code tap group-C. A route to the input of the data tap group-C is selected so that data are supplied to this input from the output of the data tap group-B, and a route to the input of the code tap group-C is selected so that replica codes are supplied to this input from the output of the code tap group-B. A route to the input of the data tap group-B is selected so that data are supplied to this input from the output of the data tap group-A, and a route to the input of the code tap group-B is selected so that replica codes are supplied to this input from the output of the code tap group-A.

Therefore, the reception data are input in order of A0, A1, A2, A3, A4, A5, . . . And a replica code C00 corresponds to the reception data A0, a replica code C01 corresponds to the reception data A1, and so forth.

As a result, the reception data having the sampling phase A and the corresponding replica codes are assigned to the data tap group-A, B, C and D and the code tap group-A, B, C, and D, respectively. The reception data that are stored in the registers of each data tap group have a 1-symbol length.

Figure 12:
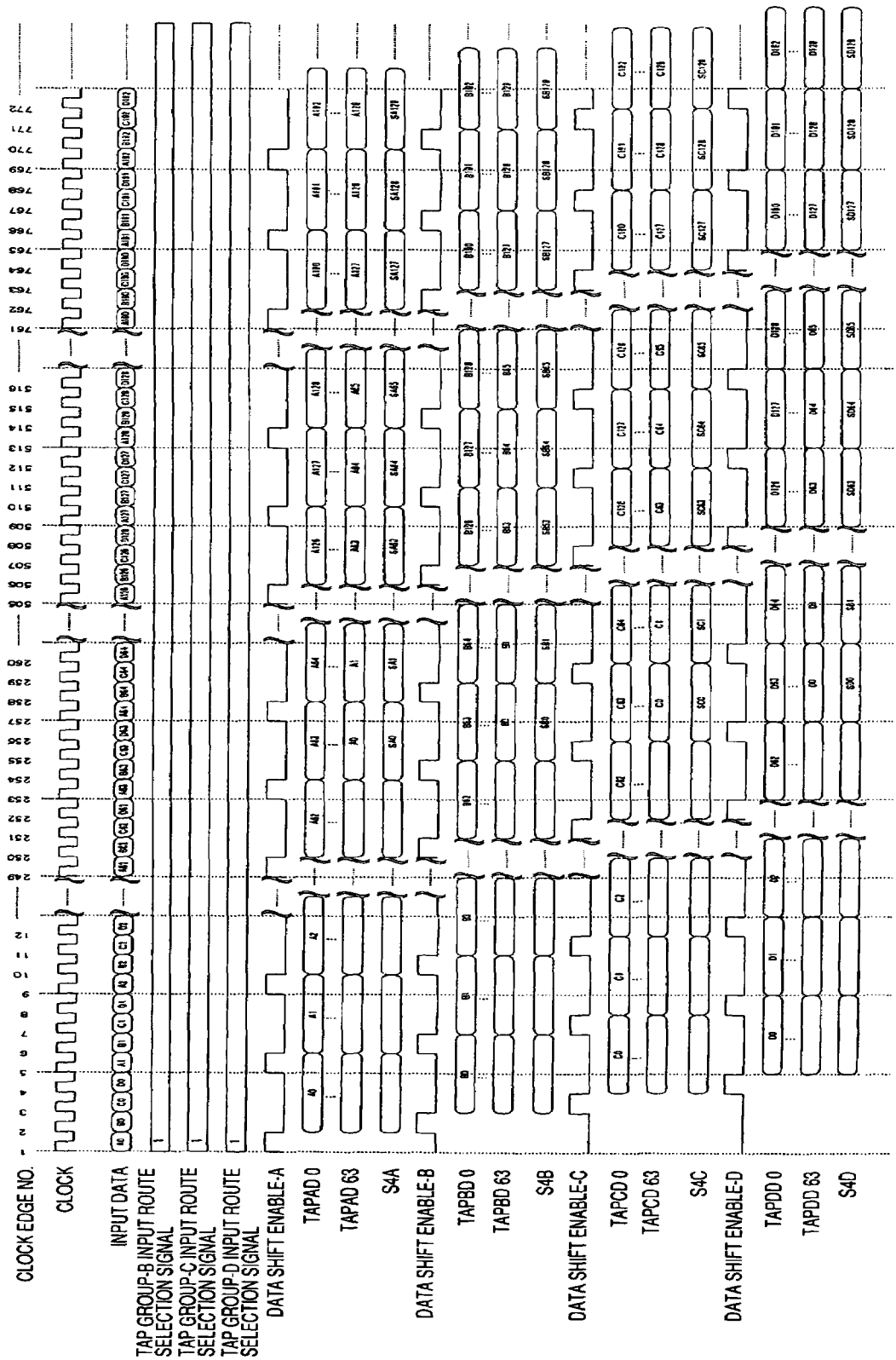
FIG. 12 is a timing chart showing an operation of the matched filter circuit according to the first embodiment of the invention in a state that 4-fold oversampling is set.

FIG. 12 is a timing chart showing various control signals, output signals TAPAD0 and TAPAD63 of the data tap group-A, output signals TAPBD0 and TAPBD63 of the data tap group-B, output signals TAPCD0 and TAPCD63 of the data tap group-C, output signals TAPDD0 and TAPDD63 of the data tap group-D, an output of the tap group-A integration block 732 to the S4A terminal that is a partial integration result for the sampling phase A, an output of the tap group-B integration block 733 to the S4B terminal that is a partial integration result for the sampling phase B, an output of the tap group-C integration block 734 to the S4C terminal that is a partial integration result for the sampling phase C, and an output of the tap group-D integration block 735 to the S4D terminal that is a partial integration result for the sampling phase D in the case of the 4-fold oversampling setting.

In the case of the 4-fold oversampling setting, the input route selection signals for the tap group-B, C, and D have a value "1." The data shift enable-A signal for the data tap group-A turns to "enable" with such timing that it is determined that the sampling phase of the input data is A. The input data is captured by the register of the data tap group-A and the data being held are shifted.

Likewise, the data shift enable-B signal for the data tap group-B turns to "enable" with such timing that it is determined that the sampling phase of the input data is B. The input data is captured by the register of the data tap group-B and the data being held are shifted. The data shift enable-C signal for the data tap group-C turns to "enable" with such timing that it is determined that the sampling phase of the input data is C. The input data is captured by the register of the data tap group-C and the data being held are shifted. The data shift enable-D signal for the data tap group-D turns to "enable" with such timing that it is determined that the sampling phase of the input data is D. The input data is captured by the register of the data tap group-D and the data being held are shifted.

The data are shifted sequentially by the data shift registers of the tap group-A, whereby an integration result SA0 for the sampling phases A0-A63 is output from the S4A terminal at the timing of clock edge No. 254 and an integration result SA1 for the sampling phases A1-A64 is output from the S4A terminal at the timing of clock edge No. 258.

Likewise, as for the tap group-B, an integration result SB0 for the sampling phases B0-B63 is output from the S4B terminal at the timing of clock edge No. 255. As for the tap group-C, an integration result SC0 for the sampling phases C0-C63 is output from the S4C terminal at the timing of clock edge No. 256. As for the tap group-D, an integration result SD0 for the sampling phases D0-D63 is output from the S4D terminal at the timing of clock edge No. 257.

Figure 13:
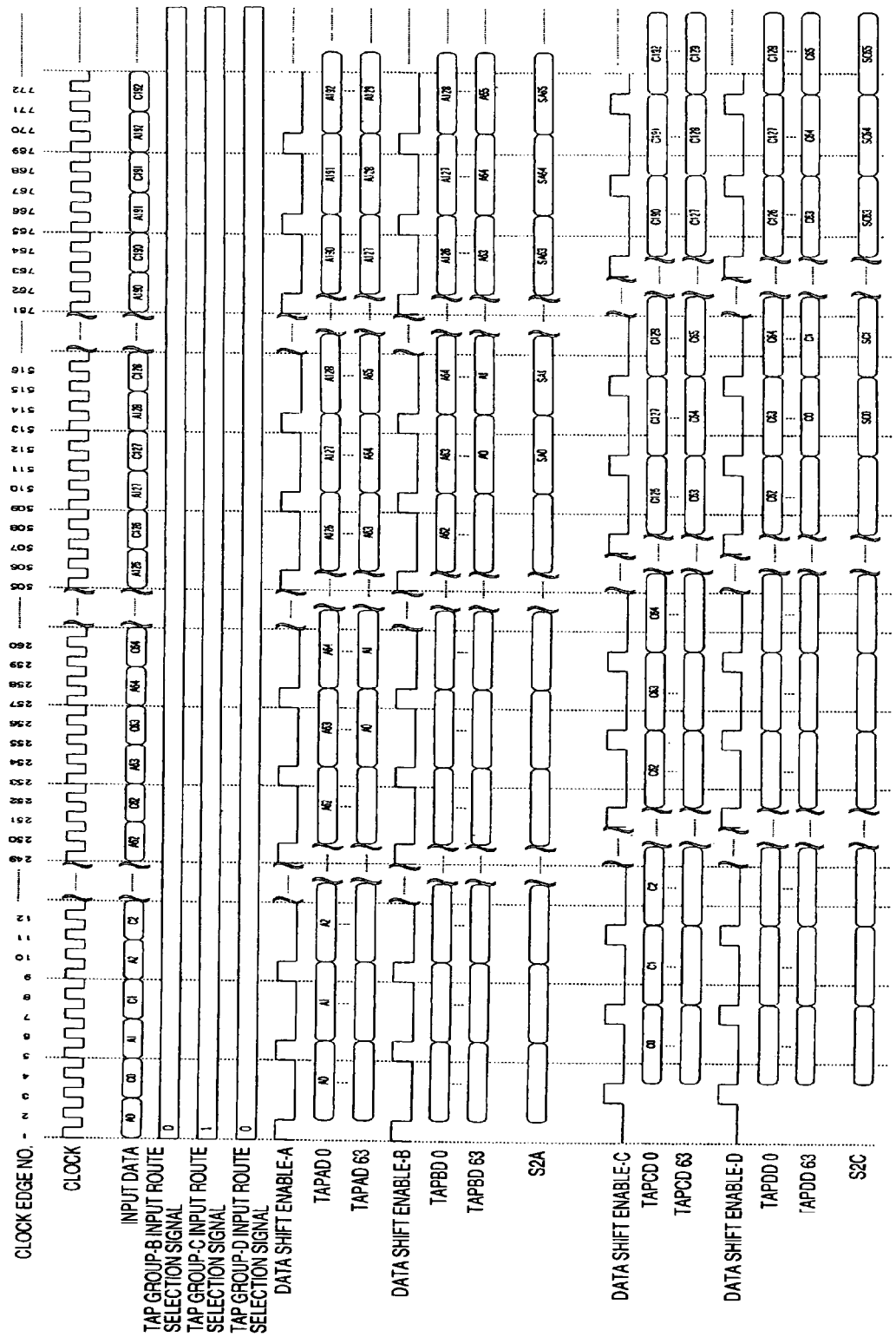
FIG. 13 is a timing chart showing an operation of the matched filter circuit according to the first embodiment of the invention in a state that 2-fold oversampling is set.

FIG. 13 is a timing chart showing various control signals, output signals TAPAD0 and TAPAD63 of the data tap group-A, output signals TAPBD0 and TAPBD63 of the data tap group-B, output signals TAPCD0 and TAPCD63 of the data tap group-C, output signals TAPDD0 and TAPDD63 of the data tap group-D, an output of the tap group-A/B addition circuit 736 to the S2A terminal that is a partial integration result for the sampling phase A, and an output of the tap group-C/D addition circuit 737 to the S2C terminal that is a partial integration result for the sampling phase C in the case of the 2-fold oversampling setting.

In the case of the 2-fold oversampling setting, the input route selection signals for the tap group-B, C, and D have values "0," "1," and "0," respectively. The data shift enable-A signal and the data shift enable-B signal for the data tap group-A and B turn to "enable" with such timing that it is determined that the sampling phase of the input data is A or B. The input data is captured by the register of the data tap group-A and the data are shifted from the data tap group-A to the data tap group-B.

Likewise, the data shift enable-C signal and the data shift enable-D signal for the data tap group-C and D turn to "enable" with such timing that it is determined that the sampling phase of the input data is C or D. The input data is captured by the register of the data tap group-C and the data are shifted from the data tap group-C to the data tap group-D.

The data are shifted sequentially by the data shift registers of the tap group-A and B, whereby an integration result SA0 for the sampling phases A0-A127 is output from the S2A terminal at the timing of clock edge No. 510 and an integration result SA1 for the sampling phases A1-A128 is output from the S2A terminal at the timing of clock edge No. 514. Likewise, as for the tap group-C and D, an integration result SC0 for the sampling phases C0-C127 is output from the S2C terminal at the timing of clock edge No. 512.

Figure 14:
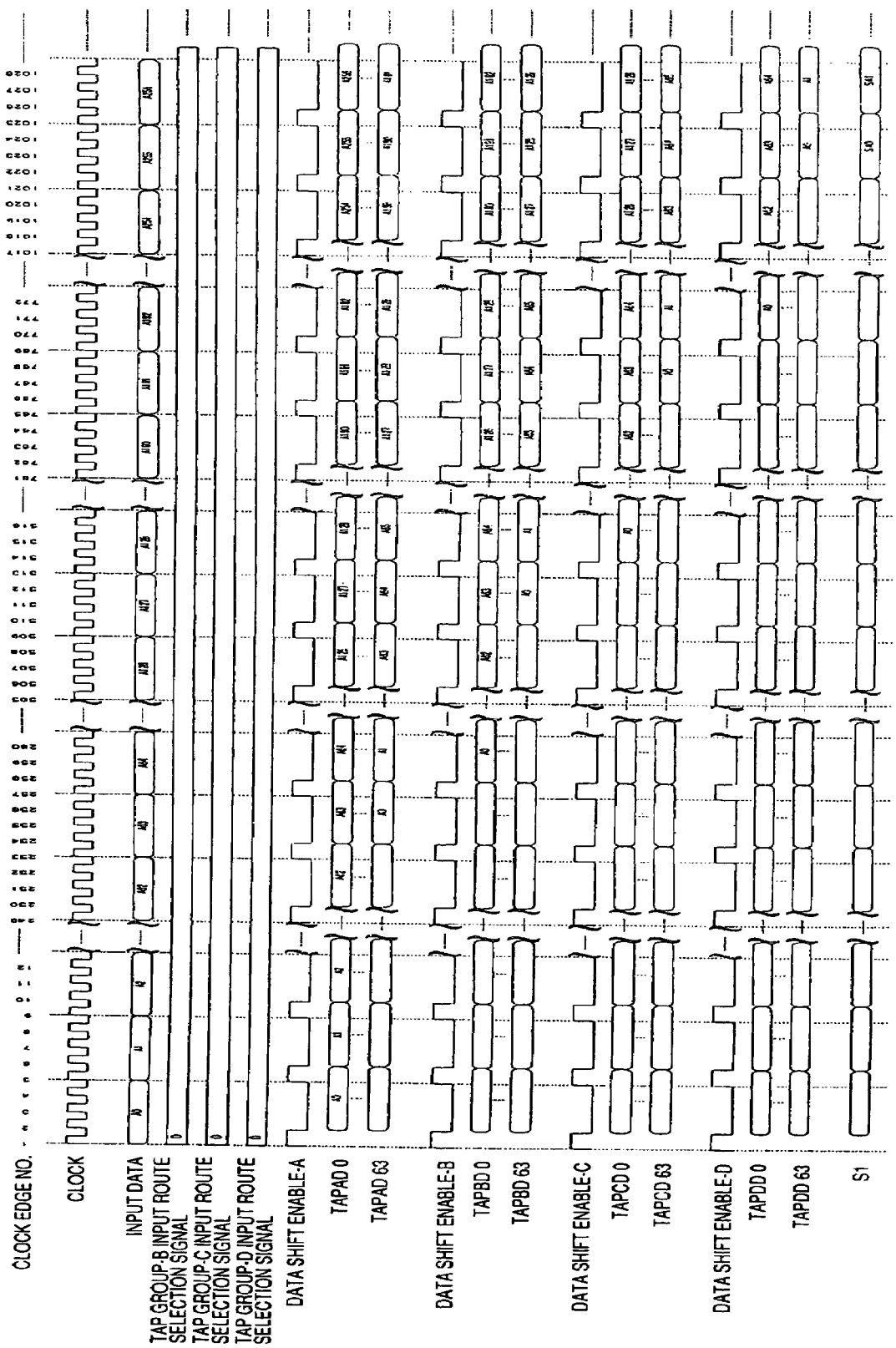
FIG. 14 is a timing chart showing an operation of the matched filter circuit according to the first embodiment of the invention in a state that 1-fold oversampling is set.

FIG. 14 is a timing chart showing various control signals, output signals TAPAD0 and TAPAD63 of the data tap group-A, output signals TAPBD0 and TAPBD63 of the data tap group-B, output signals TAPCD0 and TAPCD63 of the data tap group-C, output signals TAPDD0 and TAPDD63 of the data tap group-D, and an output of the tap group-A/B/C/D addition circuit 738 to the S1 terminal that is an integration result for the sampling phase A in the case of the 1-fold oversampling setting.

In the case of the 1-fold oversampling setting, the input route selection signals for the tap group-B, C, and D have a value "0." The data shift enable-A signal, the data shift enable-B signal, the data shift enable-C signal, and the data shift enable-D signal for the data tap group-A, B, C, and D turn to "enable" with such timing that it is determined that the sampling phase of the input data is A. The input data is captured by the register of the data tap group-A, and the data are shifted from the data tap group-A to the data tap group-B, from the data tap group-B to the data tap group-C, and from the data tap group-C to the data tap group-D.

The data are shifted sequentially by the data shift registers of the tap group-A, B, C, and D, whereby an integration result SA0 for the sampling phases A0-A255 is output from the S1 terminal at the timing of clock edge No. 1022 and an integration result SA1 for the sampling phases A1-A256 is output from the S1 terminal at the timing of clock edge No. 1026.

Figure 15:
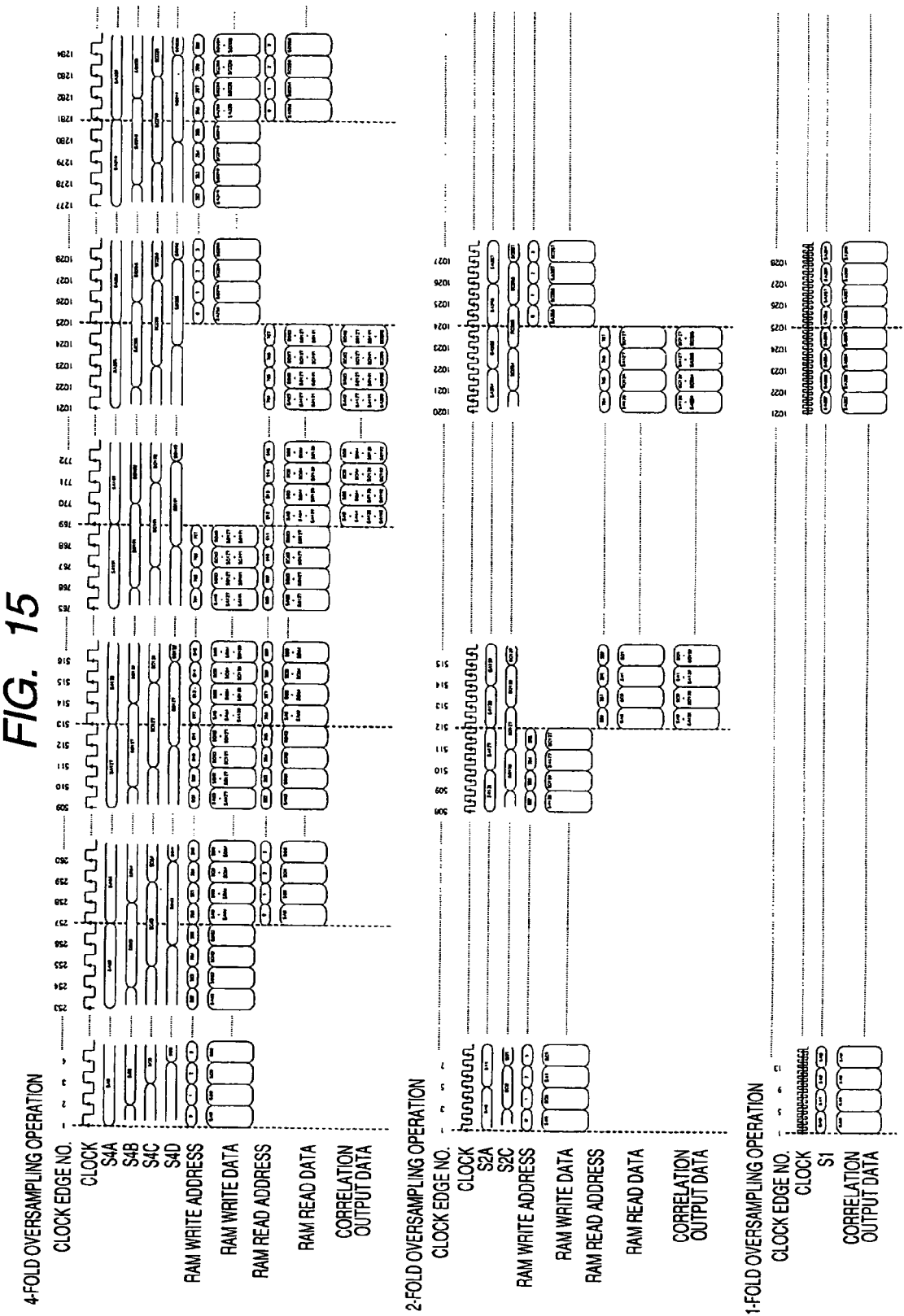
FIG. 15 is a timing chart showing a process of generating a delay profile on the basis of partial integration results that are obtained when each kind of oversampling is set in the matched filter circuit according to the first embodiment of the invention.

FIG. 15 is a timing chart showing a process of generating a delay profile as a 1-symbol correlation result on the basis of partial integration results that are obtained when each kind of oversampling (FIG. 12, 13, or 14) is set.

It is noted that the clock edge Nos. shown in FIG. 15 do not correspond to those shown in FIGS. 12-14.

Where 4-fold oversampling is set, a partial integration result SA0 of the first ¼ symbol (in the head search window) on the basis of which a delay profile for the sampling phase A is to be generated, a partial integration result SB0 of the first ¼ symbol (in the head search window) on the basis of which a delay profile for the sampling phase B is to be generated, a partial integration result SC0 of the first ¼ symbol (in the head search window) on the basis of which a delay profile for the sampling phase C is to be generated, a partial integration result SD0 of the first ¼ symbol (in the head search window) on the basis of which a delay profile for the sampling phase D is to be generated are calculated in synchronism with respective clock pulses from clock edge No. 1.

Results SA0-SA63, SB0-SB63, SC0-SC63, and SD0-SD63 that are output sequentially in the above manner are partial integration results of the first ¼ symbol on the basis of which a delay profile is to be generated, and hence are stored at addresses 0-255 of the RAM unit 706.

Results SA64-SA127, SB64-SB127, SC64-SC127, and SD64-SD127 that are output sequentially from clock edge No. 257 are partial integration results of the second ¼ symbol on the basis of which a delay profile is to be generated. Therefore, the partial integration results SA0-SA63, SB0-SB63, SC0-SC63, and SD0-SD63 of the first ¼ symbol that are stored at addresses 0-255 of the RAM unit 706 are read out, and partial integration results (SA0+SA64) to (SA63+SA127), (SB0+SB64) to (SB63+SB127), (SC0+SC64) to (SC63+SC127), and (SD0+SD64) to (SD63+SD127) of the first ²⁄₄ symbol on the basis of which a delay profile is to be generated are calculated and stored at the same addresses of the RAM unit 706.

Results SA128-SA191, SB128-SB191, SC128-SC191, and SD128-SD191 that are output from clock edge No. 513 are partial integration results of the third ¼ symbol on the basis of which a delay profile is to be generated. Therefore, the partial integration results (SA0+SA64) to (SA63+SA127), (SB0+SB64) to (SB63+SB127), (SC0+SC64) to (SC63+SC127), and (SD0+SD64) to (SD63+SD127) of the first ⅔ symbol that are stored at addresses 0-255 of the RAM unit 706 are read out, and partial integration results (SA0+SA64+SA128) to (SA63+SA127+SA191), (SB0+SB64+SB128) to (SB63+SB127+SB191), (SC0+SC64+SC128) to (SC63+SC127+SC191), and (SD0+SD64+SD128) to (SD63+SD127+SD191) of the first ¾ symbol on the basis of which a delay profile is to be generated are calculated and stored at the same addresses of the RAM unit 706.

Results SA192-SA255, SB192-SB255, SC192-SC255, and SD192-SD255 that are output sequentially from clock edge No. 769 are partial integration results of the fourth ¼ symbol on the basis of which a delay profile is to be generated. Therefore, the partial integration results (SA0+SA64+SA128) to (SA63+SA127+SA191), (SB0+SB64+SB128) to (SB63+SB127+SB191), (SC0+SC64+SC128) to (SC63+SC127+SC191), and (SD0+SD64+SD128) to (SD63+SD127+SD191) of the first ¾ symbol that are stored at addresses 0-255 of the RAM unit 706 are read out, and partial integration results (SA0+SA64+SA128+SA192) to (SA63+SA127+SA191+SA255), (SB0+SB64+SB128+SB192) to (SB63+SB127+SB191+SB255), (SC0+SC64+SC128+SC192) to (SC63+SC127+SC191+SC255), and (SD0+SD64+SD128+SD192) to (SD63+SD127+SD191+SD255) of the one entire symbol to become a delay profile are calculated and output as a 1-symbol correlation result (i.e., delay profile).

Where 2-fold oversampling is set, a partial integration result SA0 of the first ½ symbol (in the head search window) on the basis of which a delay profile for the sampling phase A is to be generated is calculated in synchronism with clock edge No. 1 and a partial integration result SC0 of the first ¼ symbol (in the head search window) on the basis of which a delay profile for the sampling phase C is to be generated is calculated after a delay of 2 clock cycles.

Results SA0-SA127 and SC0-SC127 that are output sequentially in the above manner are partial integration results of the first ½ symbol on the basis of which a delay profile is to be generated, and hence are stored at addresses 0-255 of the RAM unit 706.

Results SA128-SA255 and SC128-SC255 that are output from clock edge No. 512 are partial integration results of the second ½ symbol on the basis of which a delay profile is to be generated. Therefore, the partial integration results SA0-SA127 and SC0-SC127 of the first ½ symbol that are stored at addresses 0-255 of the RAM unit 706 are read out, and partial integration results (SA0+SA127) to (SA128+SA255) and (SC0+SC127) to (SC128+SC255) of the one entire symbol to become a delay profile are calculated and output as a 1-symbol correlation result (i.e., delay profile).

Where 1-fold oversampling is set, an integration result SA0 as a delay profile for the sampling phase A that corresponds to the head search window is calculated at clock edge No. 1. Results SA0-SA255 that are output sequentially in this manner every 4 clock cycles are integration results of the one entire symbol to become a delay profile are calculated and output as a 1-symbol correlation result (i.e., delay profile).

Figure 16:
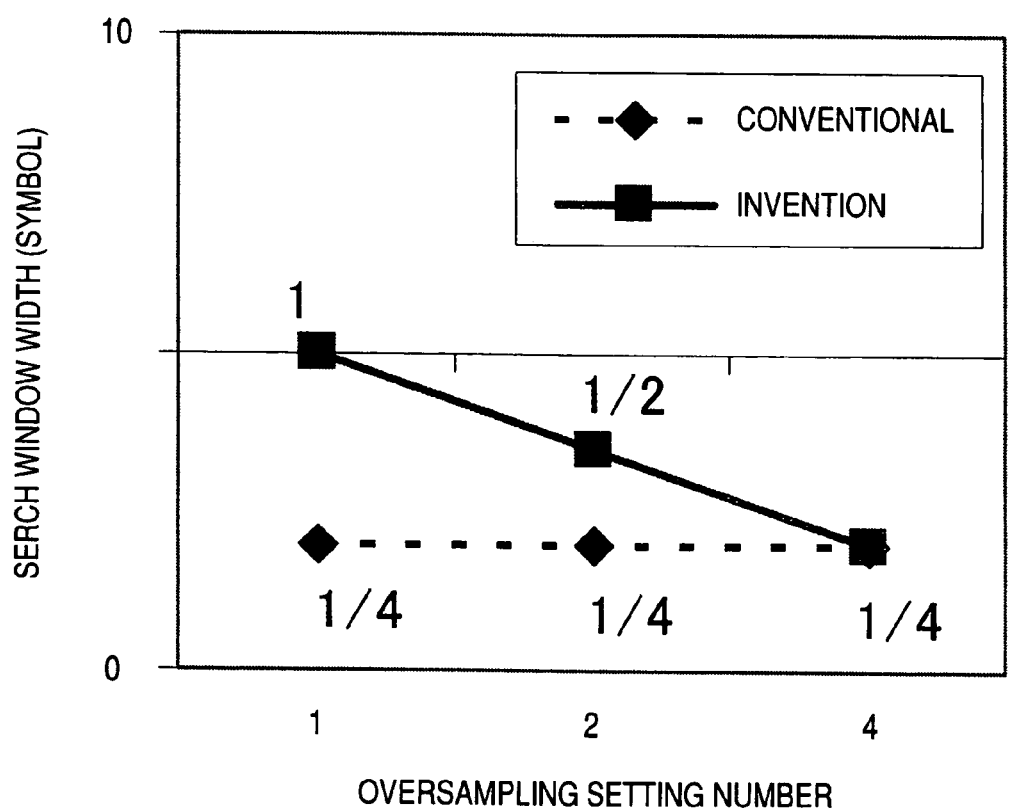
FIG. 16 shows a relationship between the oversampling setting and the search window width in the matched filter circuit according to the first embodiment of the invention.

FIG. 16 shows a relationship between the oversampling setting and the search window width in the matched filter circuit 700 according to this embodiment. In the conventional matched filter circuit, the search window width is fixed even if the oversampling setting number is switched from 4 to 2 and then to 1. In contrast, in the matched filter circuit 700 according to this embodiment, as the oversampling setting number is set to 4, 2, and 1, the search window width varies from the ¼ symbol to the ½ symbol and then to the 1 symbol. It is understood that the calculations of this embodiment are higher in functionality than those of the conventional case.

Although the matched filter circuit 700 of FIG. 7 is such that the search window width is made equal to the ¼ symbol, ½ symbol, and 1 symbol when the oversampling setting number is 4, 2, and 1, respectively, it is possible to accommodate other pairs of combinations according to the same concept.

As described above, according to the matched filter circuit 700 of this embodiment, the search window can be made wider than in the conventional circuit when the oversampling setting number is low and calculation can be performed with a lower power consumption than in the conventional circuit. Therefore, in a CDMA receiving apparatus incorporating the matched filter circuit 700 of this embodiment, the functionality of the matched filter can be enhanced and its power consumption can be lowered, whereby functionality enhancement and reduction in power consumption can be attained in related systems.

Embodiment 2

Figure 17:
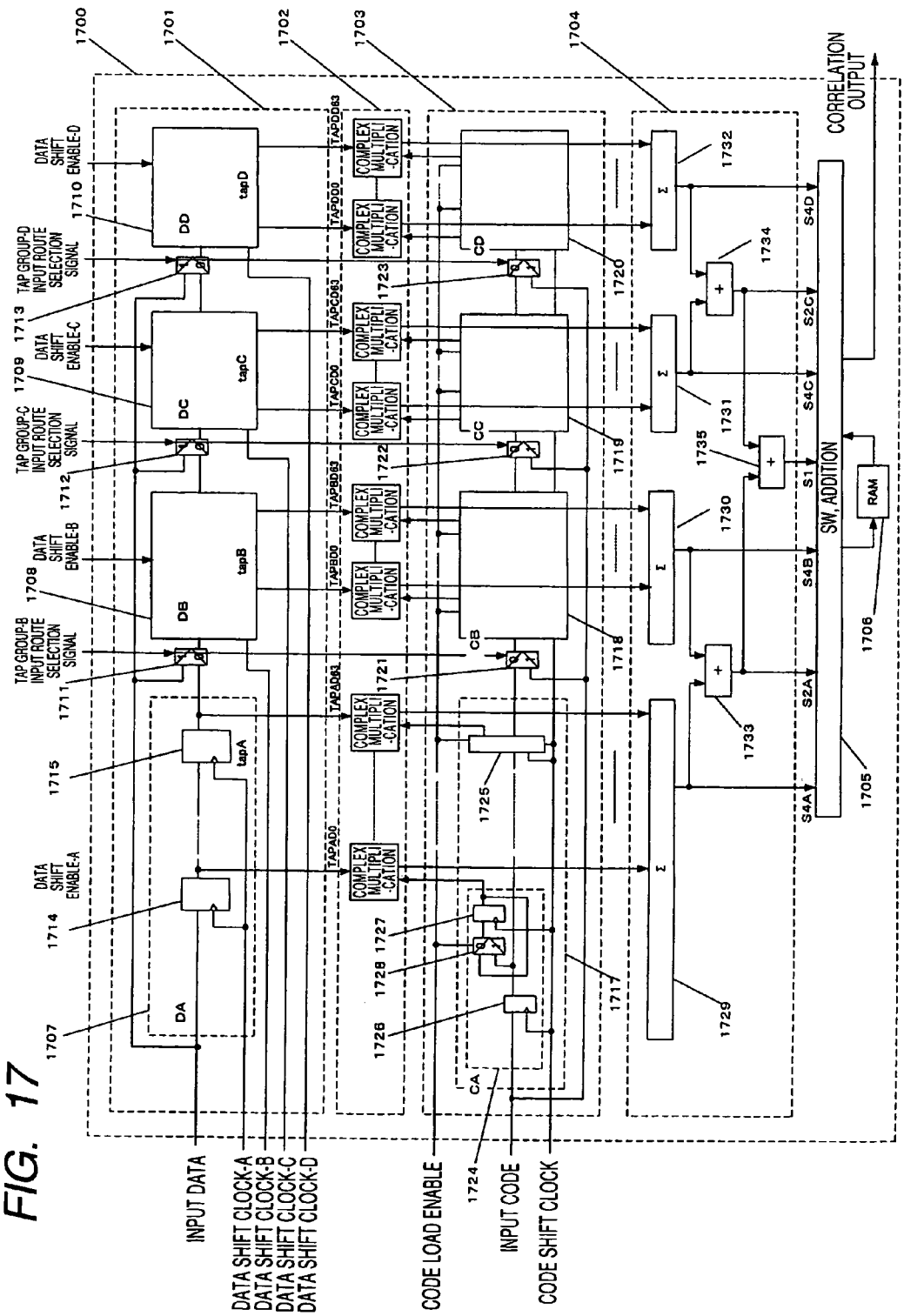
FIG. 17 is a block diagram showing the configuration of a matched filter circuit according to a second embodiment of the invention.

FIG. 17 is a block diagram showing the configuration of a matched filter circuit according to a second embodiment of the invention. As shown in FIG. 17, the matched filter circuit 1700 is composed of a data shift register unit 7101 that stores and shifts data of two systems (i.e., I and Q channels), a complex multiplication unit 1702 that despreads the data of the two systems (i.e., I and Q channels) by complex multiplication, a code shift register unit 1703 that shifts and stores replica codes of the two systems (i.e., I and Q channels) that are necessary for the despreading, an integration block 1704 that adds up despread correlation data of respective chips and outputs results from output terminals corresponding to the oversampling setting number, a cumulative addition unit 1705 that changes the data processing route in accordance with the oversampling setting and cumulatively adds results of 1-symbol integration, 4-time-divisional processing, and a RAM unit 1706 that stores a result of the 1-symbol integration, 4-time-divisional processing.

Although as described above the data shift register unit 1701, the complex multiplication unit 1702, the code shift register unit 1703, the integration block 1704, the cumulative addition unit 1705, and the RAM unit 1706 process data of the two systems (i.e., I and Q channels), only the processing for one channel will be described below to simplify the description.

The data shift register unit 1701 is composed of a data tap group-A unit 1707, a data tap group-B unit 1708, a data tap group-C unit 1709, a data tap group-D unit 1710, a data tap group-B input route selection circuit 1711, a data tap group-C input route selection circuit 1712, and a data tap group-D input route selection circuit 1713.

The data tap group-B input route selection circuit 1711 selects, as an input to the data tap group-B unit 1708, an output of the data tap group-A unit 1707 or input data to the data shift register unit 1701 in accordance with a tap group-B input route selection signal. The data tap group-C input route selection circuit 1712 selects, as an input to the data tap group-C unit 1709, an output of the data tap group-B unit 1708 or the input data to the data shift register unit 1701 in accordance with a tap group-C input route selection signal. The data tap group-D input route selection circuit 1713 selects, as an input to the data tap group-D unit 1710, an output of the data tap group-C unit 1709 or the input data to the data shift register unit 1701 in accordance with a tap group-D input route selection signal.

The data tap group-A unit 1707 is composed of data register circuits 1714, 1715, ... that shift data that are input from a data input terminal according to a data shift clock that is input from a data input terminal. The data register circuit 1714 corresponds to the first one of 64 taps that are connected to the data input terminal and have a shift register structure, and the data register circuit 1715 corresponds to the 64th one of the 64 taps.

Outputs of the first to 64th data register circuits 1714, 1715, ..., which are connected to the data input terminal and have a shift register structure, are data stored in the respective taps.

The data tap group-B unit 1708, the data tap group-C unit 1709, and the data tap group-D unit 1710 are configured in the same manner as the data tap group-A unit 1707.

The complex multiplication unit 1702 is configured in the same manner as the complex multiplication circuit 702 shown in FIG. 7 (first embodiment).

Configured analogously to the code shift register unit 1701, the data shift register unit 1703 is composed of a code tap group-A unit 1717, a code tap group-B unit 1718, a code tap group-C unit 1719, and a code tap group-D unit 1720, a code tap group-B input route selection circuit 1721, a code tap group-C input route selection circuit 1722, and a code tap group-D input route selection circuit 1723.

The code tap group-B input route selection circuit 1721 selects, as an input to the code tap group-B unit 1718, an output of the code tap group-A unit 1717 or an input code to the code shift register unit 1703 in accordance with a tap group-B input route selection signal. The code tap group-C input route selection circuit 1722 selects, as an input to the code tap group-C unit 1719, an output of the code tap group-B unit 1718 or the input code to the code shift register unit 1703 in accordance with a tap group-C input route selection signal. The code tap group-D input route selection circuit 1723 selects, as an input to the code tap group-D unit 1720, an output of the code tap group-C unit 1719 or the input code to the code shift register unit 1703 in accordance with a tap group-D input route selection signal.

The code tap group-A unit 1717 is composed of code register units 1724, 1725, ... that shift, serial/parallel-convert, and store replica codes that are input from a code input terminal. The code register unit 1724 corresponds to the first one of 64 taps that are connected to the code input terminal and have a shift register structure, and the code register unit 1725 corresponds to the 64th one of the 64 taps.

Outputs of the first to 64th code register units 1724, 1725, ..., which are connected to the code input terminal and have a shift register structure, serve as codes that are stored and held in the respective taps.

The code tap group-B unit 1718, the code tap group-C unit 1719, and the code tap group-D unit 1720 are configured in the same manner as the code tap group-A unit 1717.

The code register unit 1724 is composed of a code shift register circuit 1726 that shifts a replica code that is input from the code input terminal according to a code shift clock, a code holding register circuit 1727 that serial/parallel-converts the serial code of the code shift register circuit 1726 and holds a result, and a code hold/update selection circuit 1728 that switches between holding and updating of the code holding register circuit 1727 in accordance with a code load enable signal that is supplied externally.

The integration block 1704 is configured in the same manner as the integration block 704 shown in FIG. 7 (first embodiment).

The matched filter circuit 1700 according to this embodiment operates generally in the same manner as the matched filter circuit 700 according to the first embodiment that was described above with reference to FIGS. 8-10. Next, a flow of generation of a delay profile by the matched filter circuit 1700 according to the embodiment will be described with reference to FIGS. 18-21.

Methods for shifting data and replica codes in the matched filter circuit 1700 in the case of the 4-fold, 2-fold, and 1-fold oversampling setting, respectively, are the same as in the first embodiment (see FIG. 11).

Figure 18:
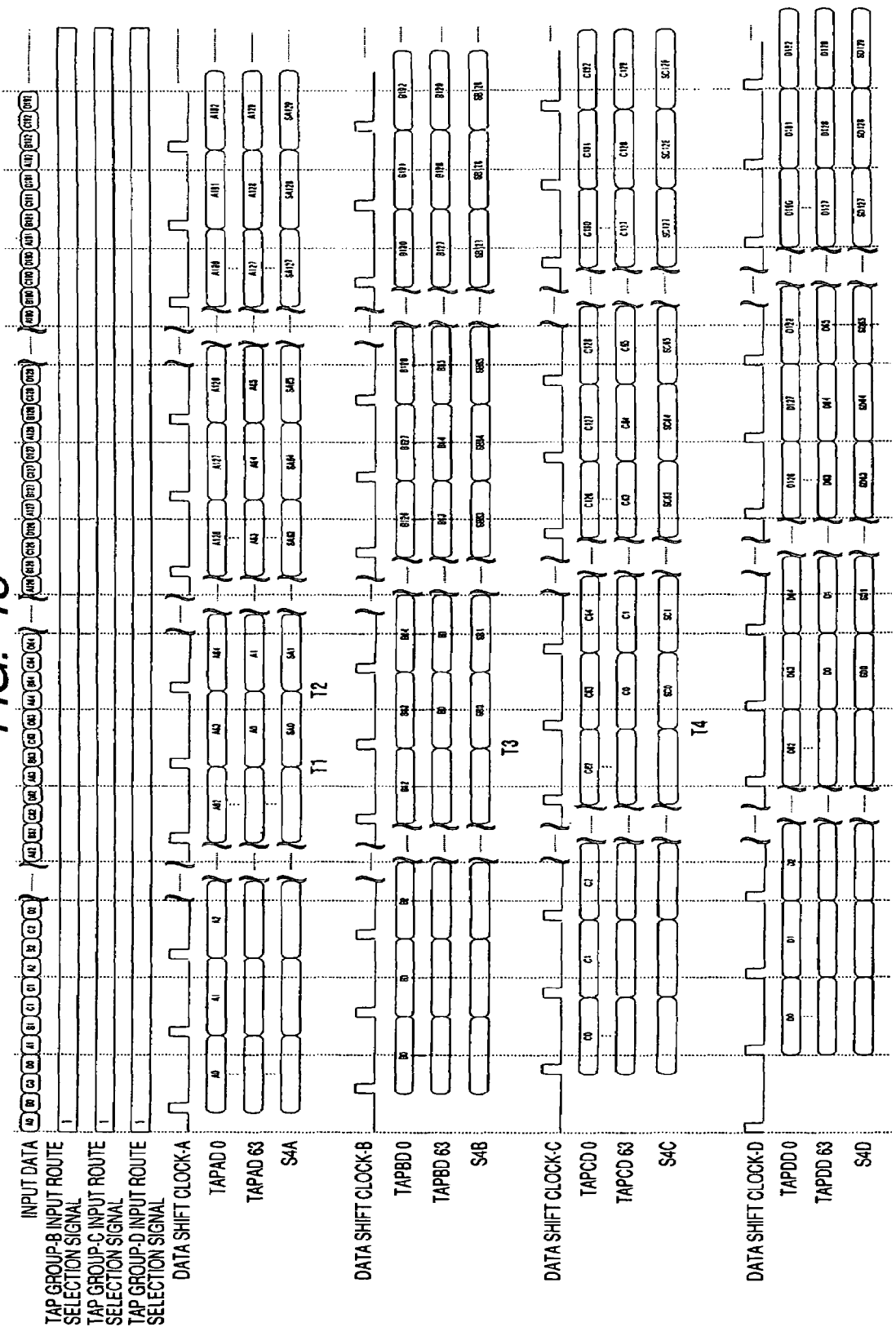
FIG. 18 is a timing chart showing an operation of the matched filter circuit according to the second embodiment of the invention in a state that 4-fold oversampling is set.

FIG. 18 is a timing chart showing various control signals, output signals TAPAD0 and TAPAD63 of the data tap group-A, output signals TAPBD0 and TAPBD63 of the data tap group-B, output signals TAPCD0 and TAPCD63 of the data tap group-C, output signals TAPDD0 and TAPDD63 of the data tap group-D, an output of the tap group-A integration block 1729 to the S4A terminal that is a partial integration result for the sampling phase A, an output of the tap group-B integration block 1730 to the S4B terminal that is a partial integration result for the sampling phase B, an output of the tap group-C integration block 1731 to the S4C terminal that is a partial integration result for the sampling phase C, and an output of the tap group-D integration block 1732 to the S4D terminal that is a partial integration result for the sampling phase D in the case of the 4-fold oversampling setting.

In the case of the 4-fold oversampling setting, the input route selection signals for the tap group-B, C, and D have a value "1." The data shift clock-A signal for the data tap group-A rises with such timing that it is determined that the sampling phase of the input data is A. The input data is captured by the register of the data tap group-A and the data being held are shifted.

Likewise, the data shift clock-B signal for the data tap group-B rises with such timing that it is determined that the sampling phase of the input data is B. The input data is captured by the register of the data tap group-B and the data being held are shifted. The data shift clock-C signal for the data tap group-C rises with such timing that it is determined that the sampling phase of the input data is C. The input data is captured by the register of the data tap group-C and the data being held are shifted. The data shift clock-D signal for the data tap group-D rises with such timing that it is determined that the sampling phase of the input data is D. The input data is captured by the register of the data tap group-D and the data being held are shifted.

The data are shifted sequentially by the data shift registers of the tap group-A, whereby an integration result SA0 for the sampling phases A0-A63 is output from the S4A terminal at timing T1 and an integration result SA1 for the sampling phases A1-A64 is output from the S4A terminal at timing T2.

Likewise, as for the tap group-B, an integration result SB0 for the sampling phases B0-B63 is output from the S4B terminal at timing T3. As for the tap group-C, an integration result SC0 for the sampling phases C0-C63 is output from the S4C terminal at timing T4. As for the tap group-D, an integration result SD0 for the sampling phases D0-D63 is output from the S4D terminal at timing T5.

Figure 19:
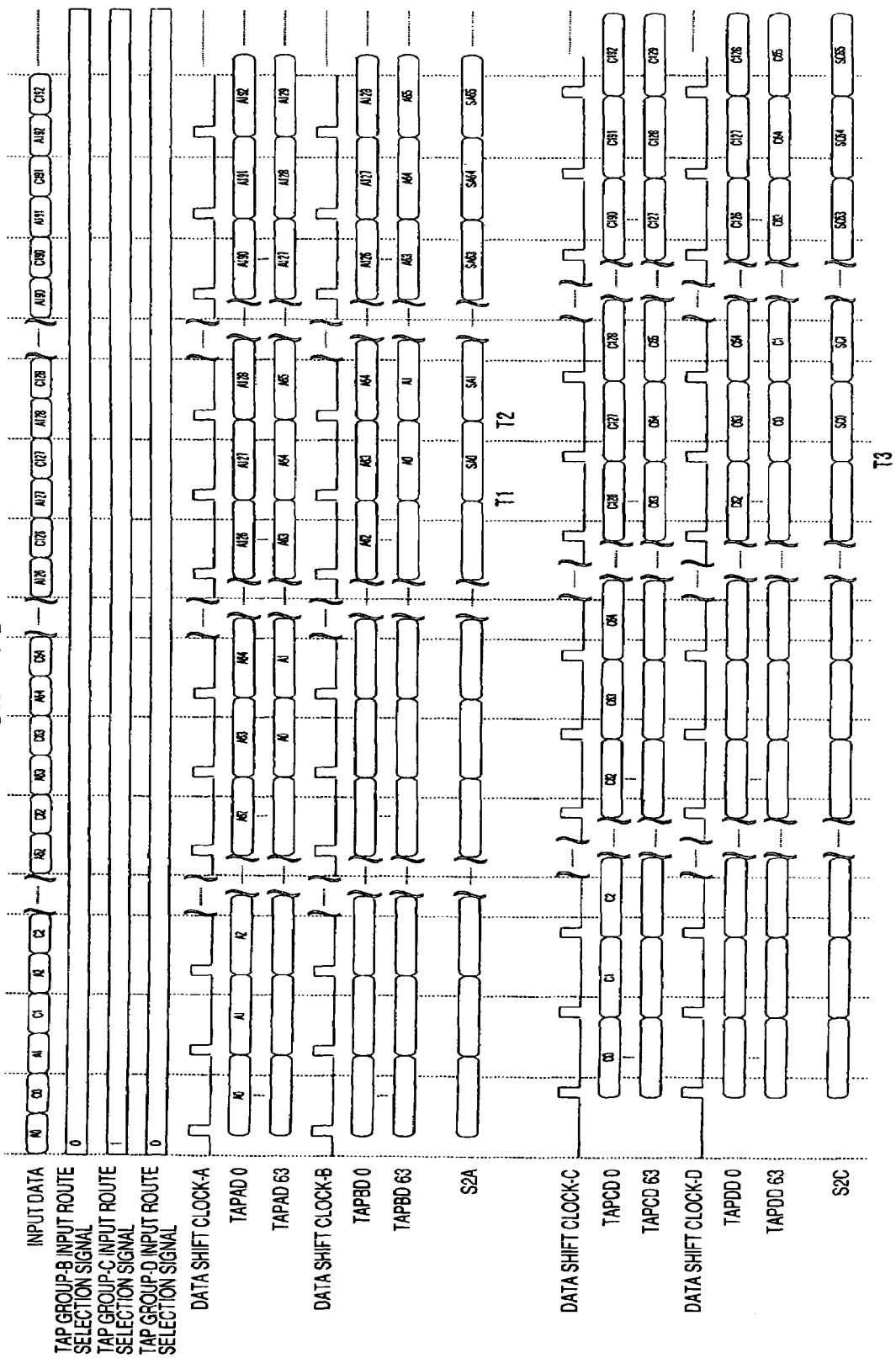
FIG. 19 is a timing chart showing an operation of the matched filter circuit according to the second embodiment of the invention in a state that 2-fold oversampling is set.

FIG. 19 is a timing chart showing various control signals, output signals TAPAD0 and TAPAD63 of the data tap group-A, output signals TAPBD0 and TAPBD63 of the data tap group-B, output signals TAPCD0 and TAPCD63 of the data tap group-C, output signals TAPDD0 and TAPDD63 of the data tap group-D, an output of the tap group-A/B addition circuit 1733 to the S2A terminal that is a partial integration result for the sampling phase A, and an output of the tap group-C/D addition circuit 1734 to the S2C terminal that is a partial integration result for the sampling phase C in the case of the 2-fold oversampling setting.

In the case of the 2-fold oversampling setting, the input route selection signals for the tap group-B, C, and D have values "0," "1," and "0," respectively. The data shift clock-A signal and the data shift clock-B signal for the data tap group-A and B rise with such timing that it is determined that the sampling phase of the input data is A or B. The input data is captured by the register of the data tap group-A and the data are shifted from the data tap group-A to the data tap group-B.

Likewise, the data shift clock-C signal and the data shift clock-D signal for the data tap group-C and D rise with such timing that it is determined that the sampling phase of the input data is C or D. The input data is captured by the register of the data tap group-C and the data are shifted from the data tap group-C to the data tap group-D.

The data are shifted sequentially by the data shift registers of the tap group-A and B, whereby an integration result SA0 for the sampling phases A0-A127 is output from the S2A terminal at timing T1 and an integration result SA1 for the sampling phases A1-A128 is output from the S2A terminal at timing T2. Likewise, as for the tap group-C and D, an integration result SC0 for the sampling phases C0-C127 is output from the S2C terminal at timing T3.

Figure 20:
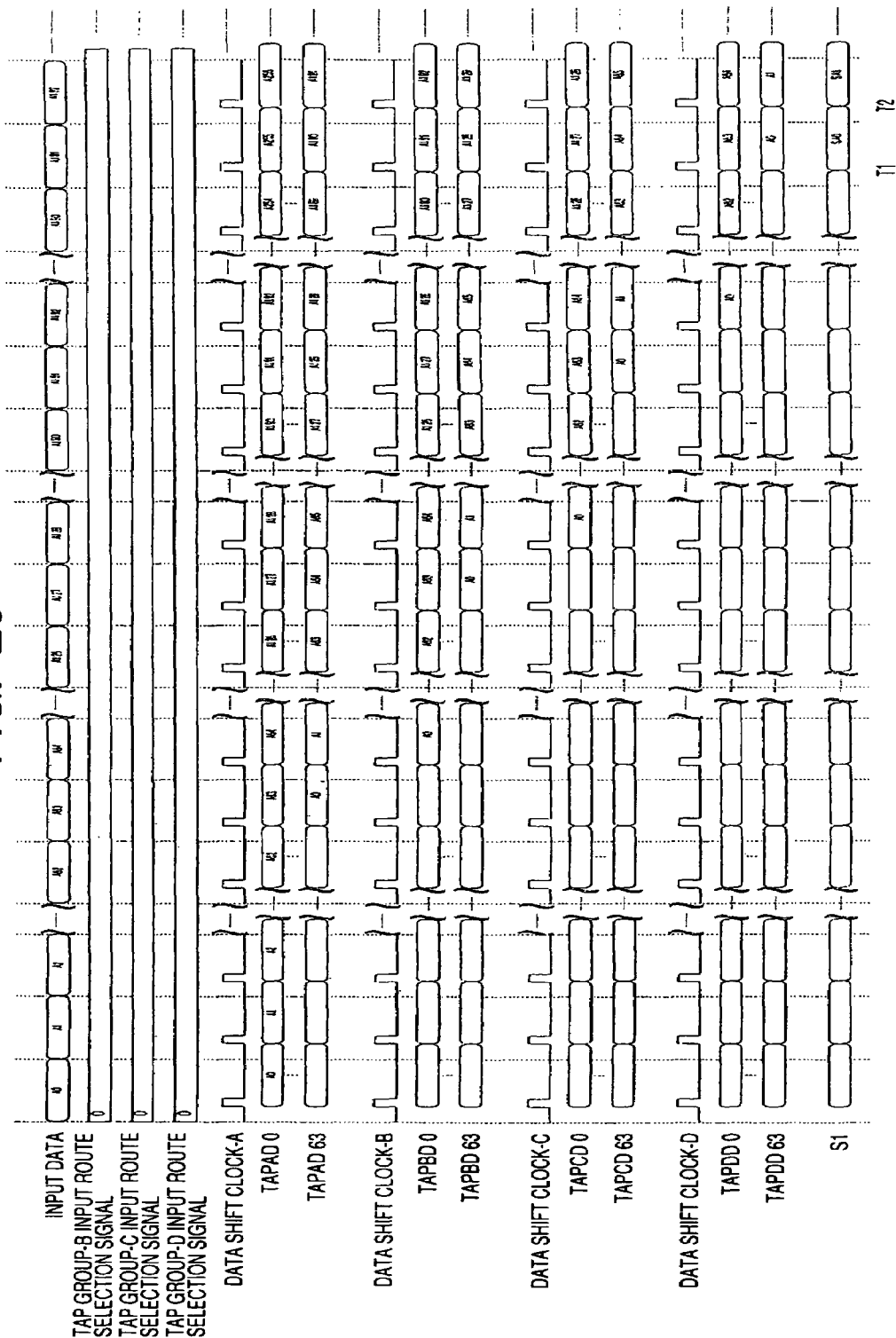
FIG. 20 is a timing chart showing an operation of the matched filter circuit according to the second embodiment of the invention in a state that 1-fold oversampling is set.

FIG. 20 is a timing chart showing various control signals, output signals TAPAD0 and TAPAD63 of the data tap group-A, output signals TAPBD0 and TAPBD63 of the data tap group-B, output signals TAPCD0 and TAPCD63 of the data tap group-C, output signals TAPDD0 and TAPDD63 of the data tap group-D, and an output of the tap group-A/B/C/D addition circuit 1735 to the S1 terminal that is an integration result for the sampling phase A in the case of the 1-fold oversampling setting.

In the case of the 1-fold oversampling setting, the input route selection signals for the tap group-B, C, and D have a value "0." The data shift clock-A signal, the data shift clock-B signal, the data shift clock-C signal, and the data shift clock-D signal for the data tap group-A, B, C, and D rise with such timing that it is determined that the sampling phase of the input data is A. The input data is captured by the register of the data tap group-A, and the data are shifted from the data tap group-A to the data tap group-B, from the data tap group-B to the data tap group-C, and from the data tap group-C to the data tap group-D.

The data are shifted sequentially by the data shift registers of the tap group-A, B, C, and D, whereby an integration result SA0 for the sampling phases A0-A255 is output from the S1 terminal at timing T1 and an integration result SA1 for the sampling phases A1-A256 is output from the S1 terminal at timing T2.

Figure 21:
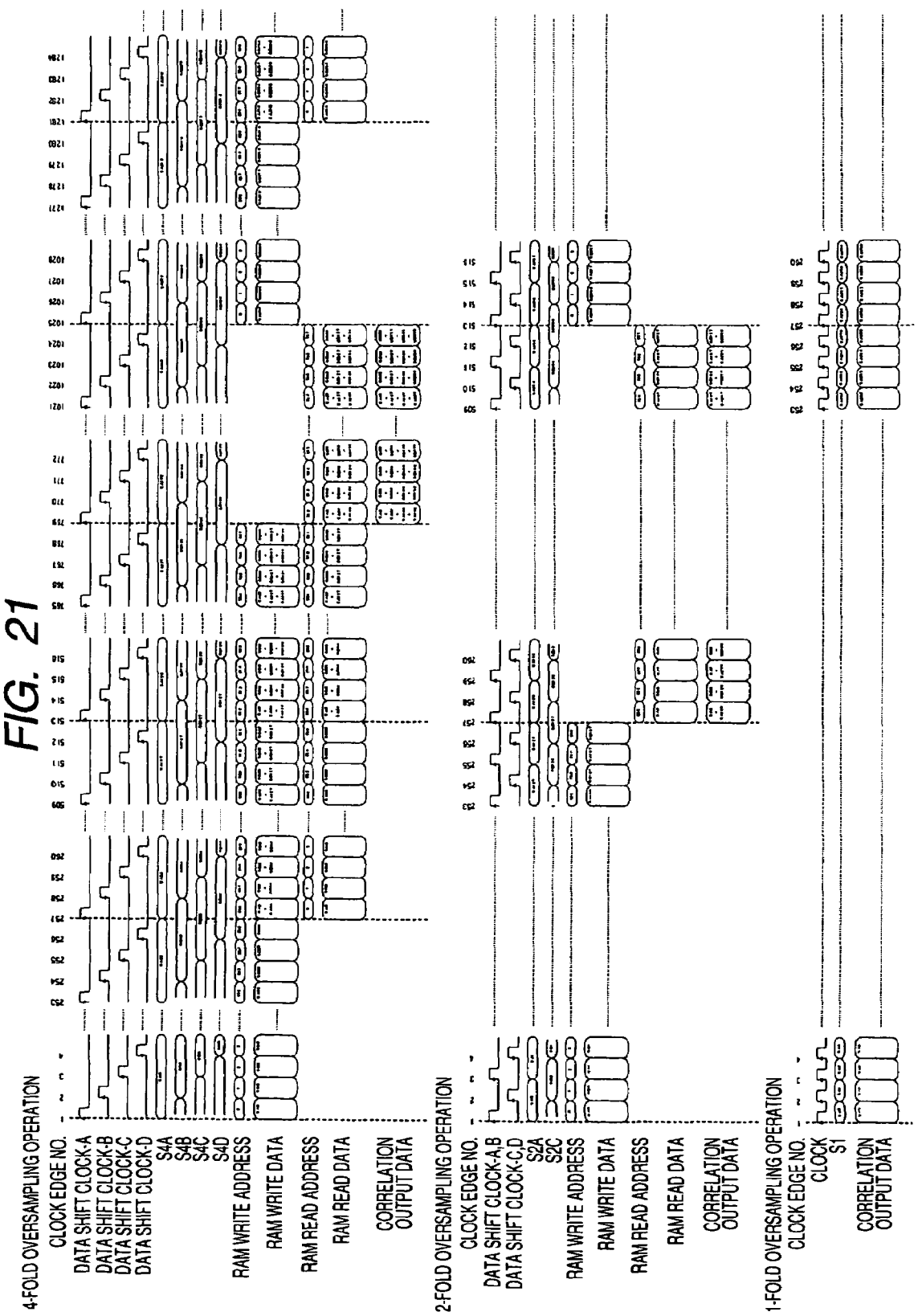
FIG. 21 is a timing chart showing a process of generating a delay profile on the basis of partial integration results that are obtained when each kind of oversampling is set in the matched filter circuit according to the second embodiment of the invention.

FIG. 21 is a timing chart showing a process of generating a delay profile as a 1-symbol correlation result on the basis of partial integration results that are obtained when each kind of oversampling (FIG. 18, 19, or 20) is set. The process that the matched filter circuit 1700 according to this embodiment generates a delay profile when each kind of oversampling is set is the same as in the first embodiment (see FIG. 15), and hence will not be described.

In the matched filter circuit 1700 according to this embodiment, the shift controls on the data shift registers are performed by using the clock corresponding to each sampling phase. Therefore, the power consumption can be made even lower than in the matched filter circuit 700 according to the first embodiment.

Although the matched filter circuit 1700 of FIG. 17 is such that the search window width is made equal to the ¼ symbol, ½ symbol, and 1 symbol when the oversampling setting number is 4, 2, and 1, respectively, it is possible to accommodate other pairs of combinations according to the same concept.

Embodiment 3

Figure 22:
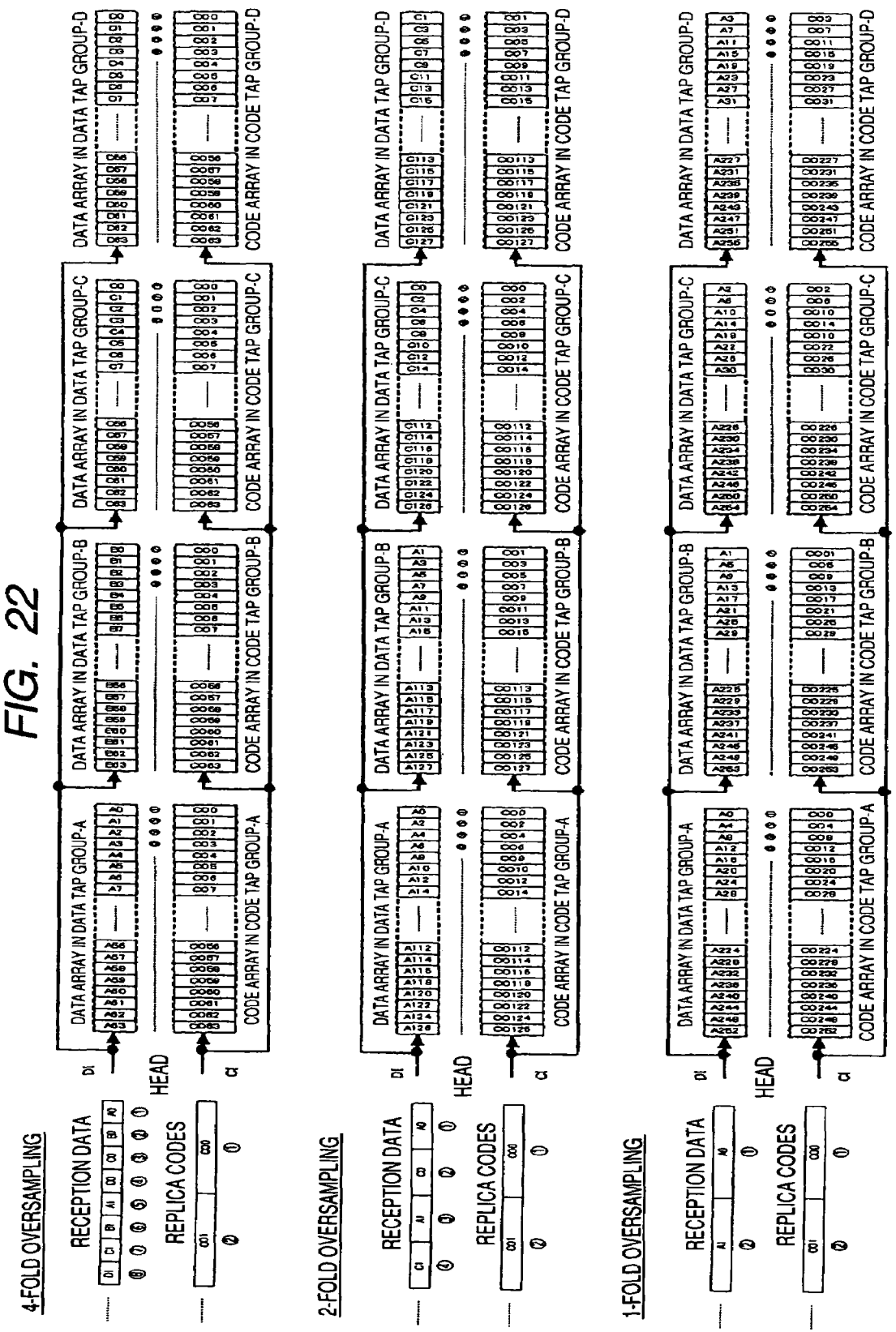
FIG. 22 shows methods for shifting data and replica codes in a matched filter circuit according to a third embodiment of the invention in the case of each kind of oversampling setting.
Figure 23:
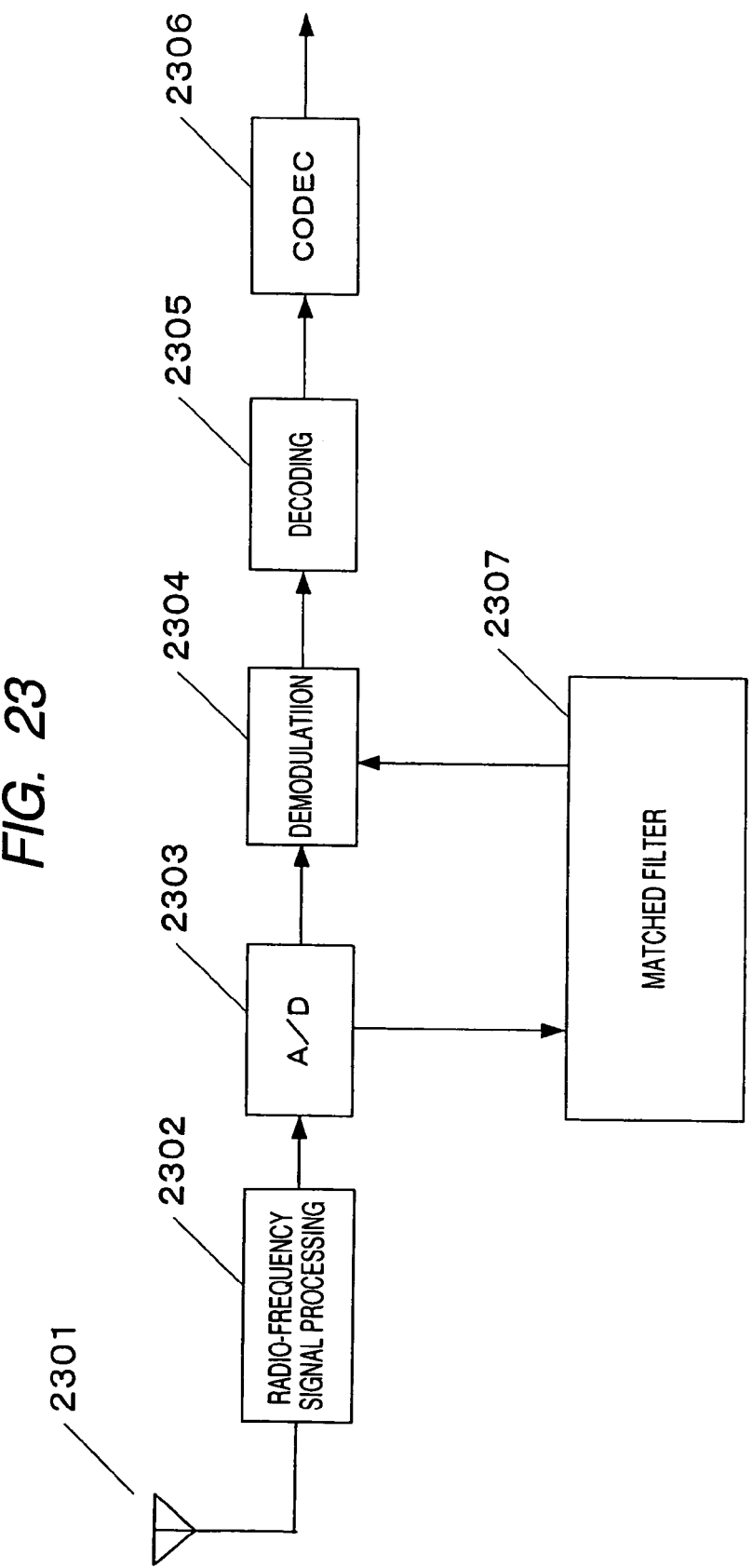
FIG. 23 is a block diagram showing the configuration of the main part of a general CDMA reception apparatus.

FIG. 22 shows methods for shifting data and replica codes in a matched filter circuit according to a third embodiment of the invention in the case of 4-fold, 2-fold, and 1-fold oversampling setting, respectively, in a process of generating a delay profile.

The left part of FIG. 22 shows reception data and replica codes that are received in the case of each kind of oversampling setting, and the right part shows routes of the reception data and the replica codes that are selected in the case of each kind of oversampling setting and how one-round sequences of reception data and replica codes are stored in the registers.

In all the kinds of oversampling setting, the routes of input of data and replica codes to the data tap group-A to D and the code tap group-A to D are fixed; that is, data and replica codes are input from the D1 input terminal and the CI input terminal, respectively.

Where 4-fold oversampling is set, reception data are input in order of A0, B0, C0, D0, A1, B1, . . . And a replica code C00 corresponds to the reception data (A0, B0, C0, D0), a replica code C01 corresponds to the reception data (A1, B1, C1, D1), and so forth. The reception data and the replica codes are assigned to the data tap group-A to D and the code tap group-A to D in a manner shown in FIG. 22.

As a result, the reception data having the sampling phase A and the corresponding replica codes are assigned to the data tap group-A and the code tap group-A, respectively. The reception data having the sampling phase B and the corresponding replica codes are assigned to the data tap group-B and the code tap group-B, respectively. The reception data having the sampling phase C and the corresponding replica codes are assigned to the data tap group-C and the code tap group-C, respectively. The reception data having the sampling phase D and the corresponding replica codes are assigned to the data tap group-D and the code tap group-D, respectively. The reception data that are stored in the registers of each data tap group have a ¼-symbol length.

Where 2-fold oversampling is set, the reception data are input in order of A0, C0, A1, C1, A2, C2, . . . . . And a replica code C00 corresponds to the reception data (A0, C0), a replica code C01 corresponds to the reception data (A1, C1), and so forth. The reception data and the replica codes are assigned to the data tap group-A to D and the code tap group-A to D in a manner shown in FIG. 22.

As a result, the reception data having the sampling phase A and the corresponding replica codes are assigned cyclically to the data tap group-A and B and the code tap group-A and B, respectively. The reception data having the sampling phase C and the corresponding replica codes are assigned cyclically to the data tap group-C and D and the code tap group-C and D, respectively. The reception data that are stored in the registers of each data tap group have a ½-symbol length.

Where 1-fold oversampling is set, the reception data are input in order of A0, A1, A2, A3, A4, A5, . . . . . And a replica code C00 corresponds to the reception data A0, a replica code C01 corresponds to the reception data A1, and so forth. The reception data and the replica codes are assigned to the data tap group-A to D and the code tap group-A to D in a manner shown in FIG. 22.

As a result, the reception data having the sampling phase A and the corresponding replica codes are assigned cyclically to the data tap group-A, B, C and D and the code tap group-A, B, C, and D, respectively. The reception data that are stored in the registers of each data tap group have a 1-symbol length.

Now, a comparison will be made between the manner of shifting of data and replica codes in the case of each kind of oversampling setting in the matched filter circuit 700 of FIG. 11 according to the first embodiment and that in the matched filter circuit of FIG. 22 according to this embodiment.

In the case of the 4-fold oversampling setting, the manner of shifting is the same because the routes of shifting of the data tap group-A to D and the code tap group-A to D are the same.

In the case of the 2-fold oversampling setting, whereas in the matched filter circuit 700 of FIG. 11 the routes of shifting of the data tap group-A to D and the code tap group-A to D are such that a shift is made from the tap group-A to the tap group-B and from the tap group-C to the tap group-D, in the matched filter circuit of FIG. 22 a shift is made independently in each of the tap group-A, B, C, and D. In the matched filter circuit of FIG. 22, the number of registers where shifts occur at a certain instant is ½ of that in the matched filter circuit 700 of FIG. 11.

Figure 1:
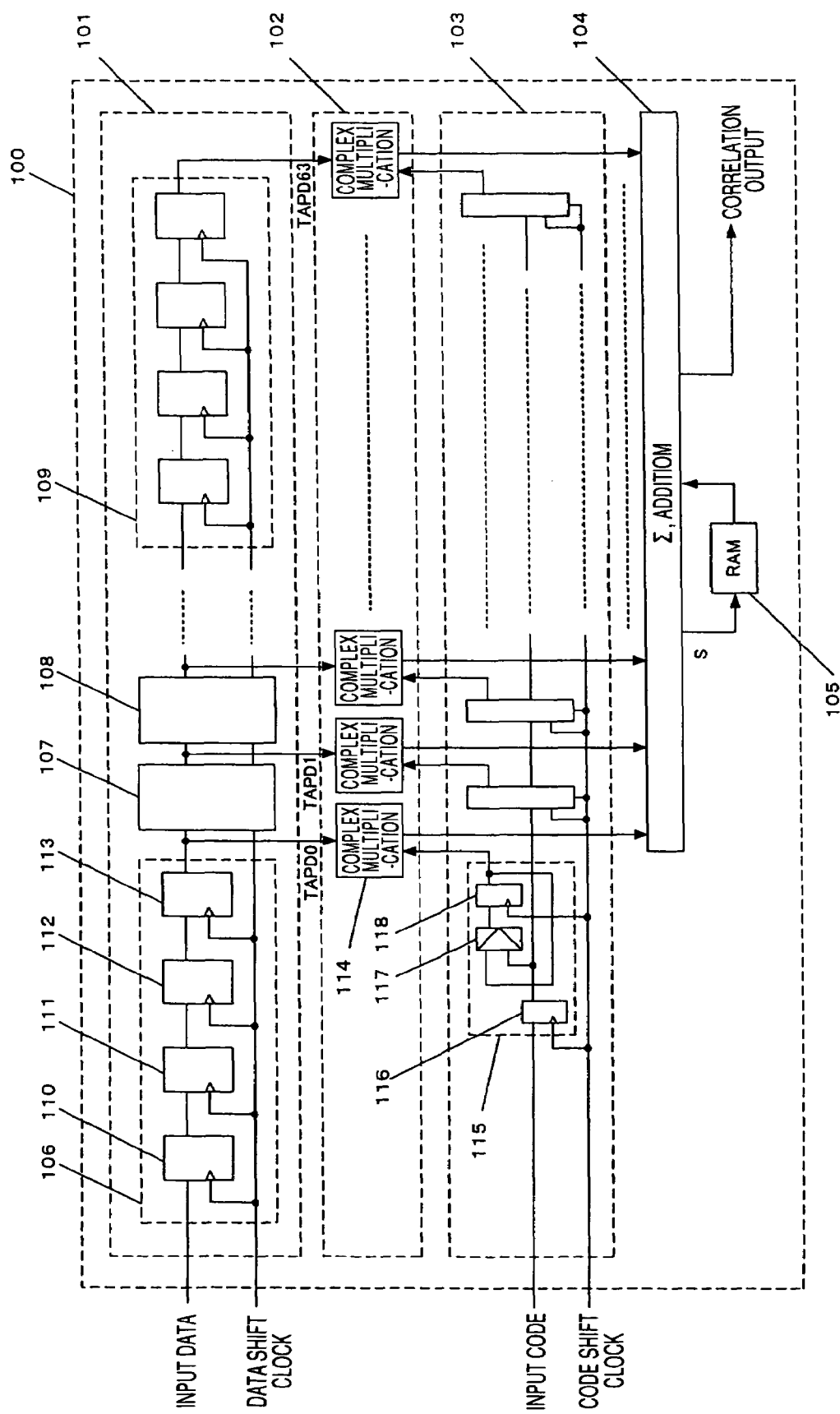
FIG. 1 is a block diagram showing the configuration of a conventional matched filter circuit.
Figure 2:
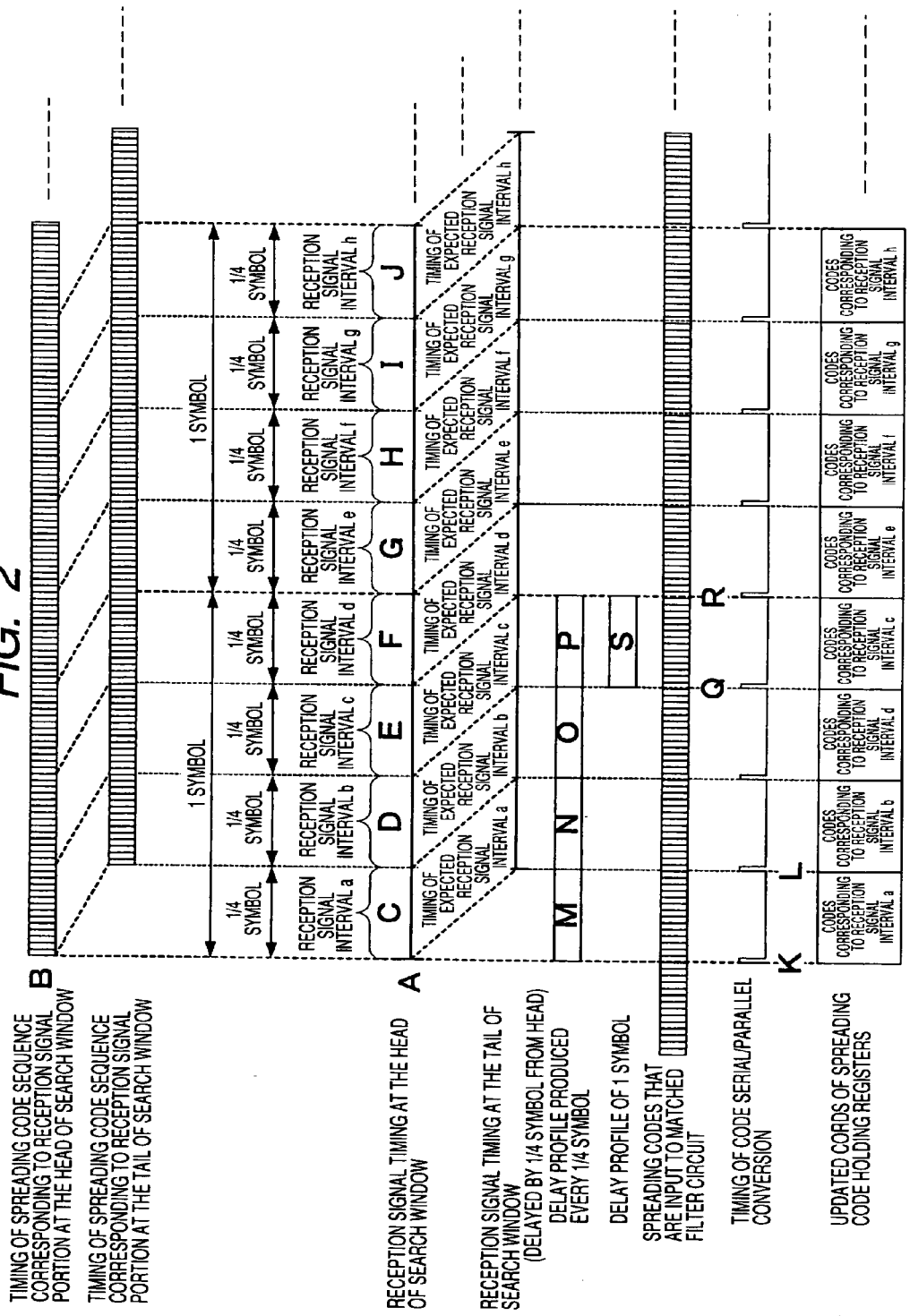
FIG. 2 is a timing chart showing processing and a search window width of the conventional matched filter circuit.
Figure 3:
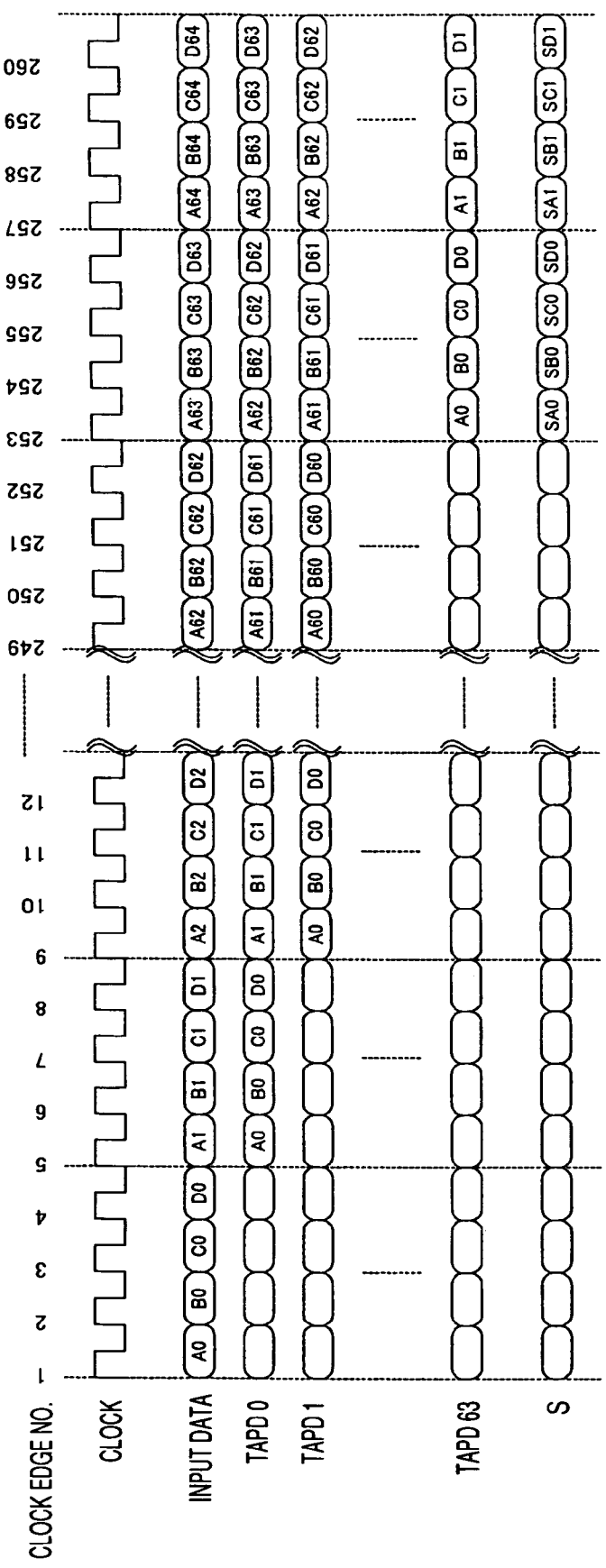
FIG. 3 is a timing chart showing an operation of the conventional matched filter circuit in a state that 4-fold oversampling is set.
Figure 4:
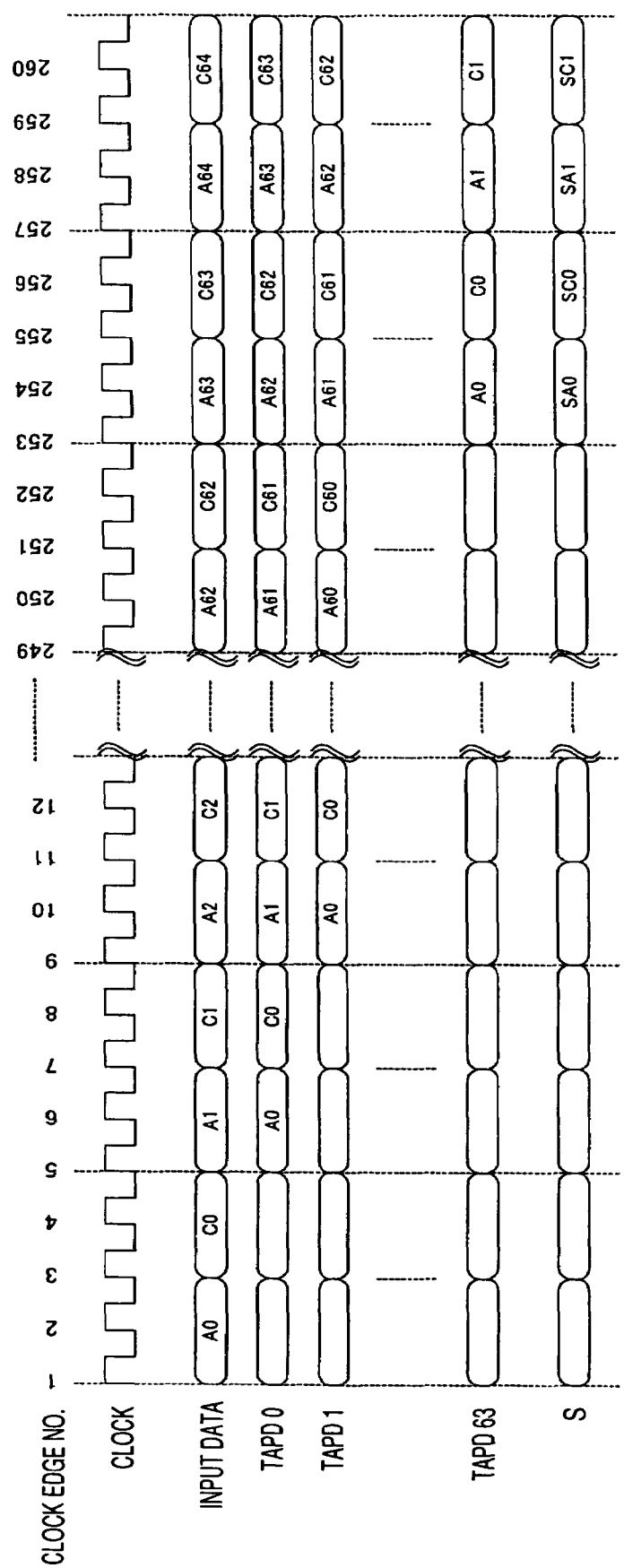
FIG. 4 is a timing chart showing an operation of the conventional matched filter circuit in a state that 2-fold oversampling is set.
Figure 5:
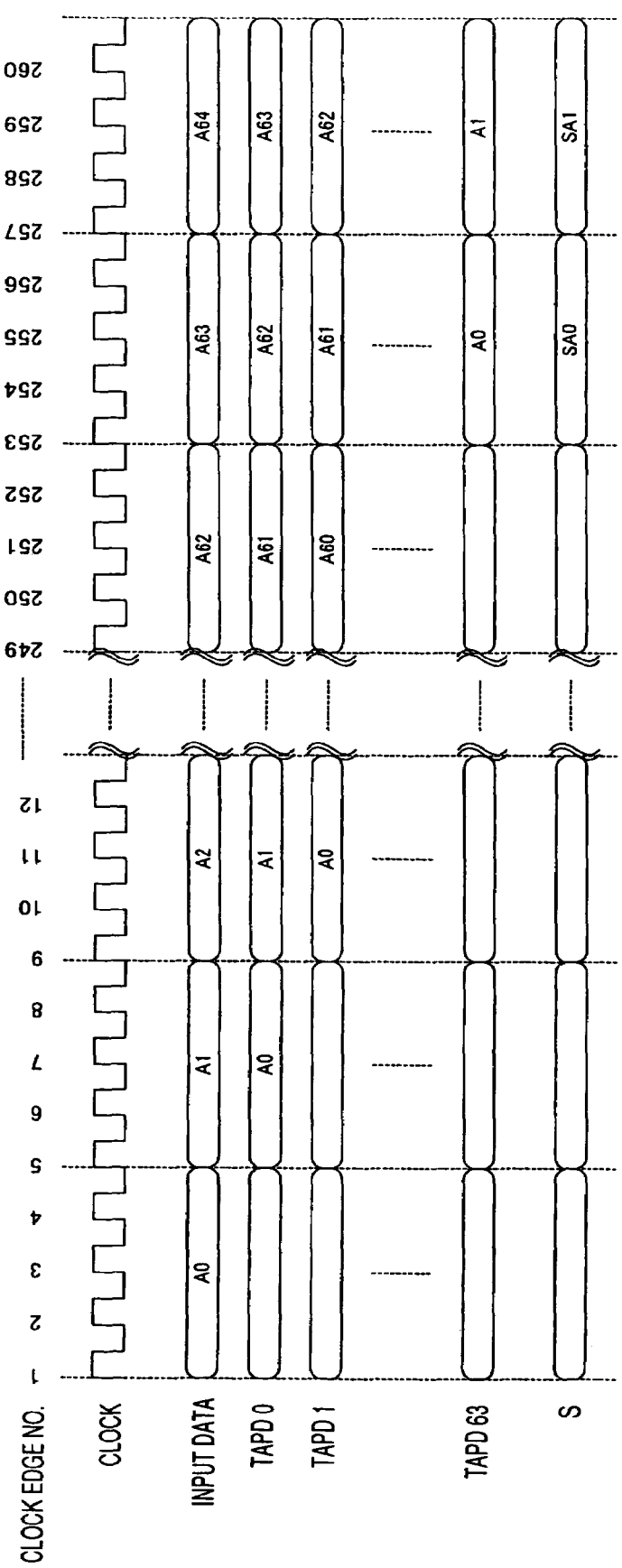
FIG. 5 is a timing chart showing an operation of the conventional matched filter circuit in a state that 1-fold oversampling is set.
Figure 6:
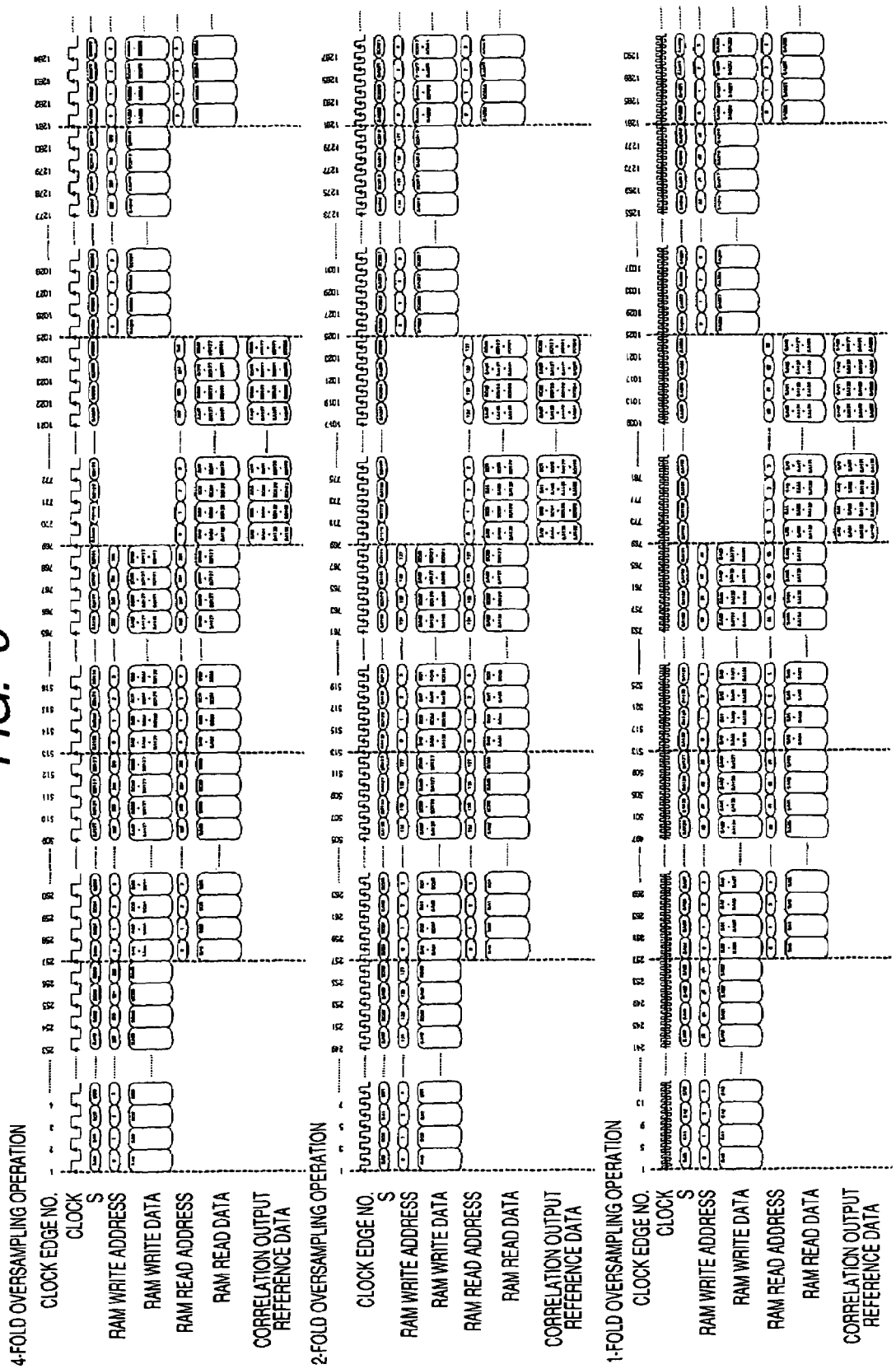
FIG. 6 is a timing chart showing how a delay profile is generated from partial integration results in the conventional matched filter circuit when each kind of oversampling is set.

In the case of the 1-fold oversampling setting, whereas in the matched filter circuit 700 of FIG. 1 the routes of shifting of the data tap group-A to D and the code tap group-A to D are such that a shift is made from the tap group-A to the tap group-B, from the tap group-B to the tap group-C, and from the tap group-C to the tap group-D, in the matched filter circuit of FIG. 22 a shift is made independently in each of the tap group-A, B, C, and D. In the matched filter circuit of FIG. 22, the number of registers where shifts occur at a certain instant is ¼ of that in the matched filter circuit 700 of FIG. 11.

Therefore, the matched filter circuit according to this embodiment can operate with an even lower power consumption than the matched filter circuit 700 according to the first embodiment does. In this embodiment, the input route selecting means shown in FIG. 7 or 17 may be omitted.

The matched filter circuits and the correlation calculation methods according to the invention are useful as a matched filter circuit that is used for synchronization establishment processing etc. of the spread spectrum communication, its correlation calculation method, etc. because of the following advantages. The data shift register means and the code shift register means are controlled divisionally in groups of a number that is equal to the oversampling setting number and data having different oversampling phases are input to and shifted by the respective groups. Therefore, when the oversampling setting number is low, the number of taps can be increased by fully utilizing the circuit resources and hence the search window can be set wider. And it becomes possible to realize, more flexibly, functions that are required by a system. Further, since the power consumption can be reduced by decreasing the number of shift registers where shifts occur simultaneously, the power consumption of a system can also be reduced. In the case of a terminal apparatus, the battery driving time can be elongated further. In the case of a base station apparatus, the power consumption of the entire system in which channels are implemented at a high integration density can be reduced.

What is claimed is:

1. A matched filter circuit which receives reception data and spreading codes externally and operates according to external oversampling setting, comprising:

first data shift register means, for receiving the reception data and for storing and shifting data having a prescribed oversampling phase;

first data input route selecting means, for selecting the reception data or a shift output of a final stage of the first data shift register means in accordance with the oversampling setting;

second data shift register means, for receiving an output of the first data input route selecting means and for storing and shifting data having a prescribed oversampling phase;

second data input route selecting means, for selecting the reception data or a shift output of a final stage of the second data shift register means in accordance with the oversampling setting;

third data shift register means, for receiving an output of the second data input route selecting means and for storing and shifting data having a prescribed oversampling phase;

third data input route selecting means, for selecting the reception data or a shift output of a final stage of the third data shift register means in accordance with the oversampling setting; and fourth data shift register means, for receiving an output of the third data input route selecting means and for storing and shifting data having a prescribed oversampling phase;

first code shift register means, for receiving the spreading codes and for storing and shifting spreading codes corresponding to the first data shift register means;

first code input route selecting means, for selecting the spreading codes or a shift output of a final stage of the first code shift register means in accordance with the oversampling setting;

second code shift register means, for receiving an output of the first code input route selecting means and for storing and shifting spreading codes corresponding to the second data shift register means;

second code input route selecting means, for selecting the spreading codes or a shift output of a final stage of the second code shift register means in accordance with the oversampling setting;

third code shift register means, for receiving an output of the second code input route selecting means and for storing and shifting spreading codes corresponding to the third data shift register means;

third code input route selecting means, for selecting the spreading codes or a shift output of a final stage of the third code shift register means in accordance with the oversampling setting; and fourth code shift register means, for receiving an output of the third code input route selecting means and for storing and shifting spreading codes corresponding to the fourth data shift register means;

first despreading integration calculating means, for performing despreading calculation and integration calculation using outputs of the first data shift register means and outputs of the first code shift register means;

second despreading integration calculating means, for performing despreading calculation and integration calculation using outputs of the second data shift register means and outputs of the second code shift register means;

third despreading integration calculating means, for performing despreading calculation and integration calculation using outputs of the third data shift register means and outputs of the third code shift register means; and fourth despreading integration calculating means, for performing despreading calculation and integration calculation using outputs of the fourth data shift register means and outputs of the fourth code shift register means;

first adding means, for adding together an output of the first despreading integration calculating means and an output of the second despreading integration calculating means;

second adding means, for adding together an output of the third despreading integration calculating means and an output of the fourth despreading integration calculating means; and third adding means, for adding together an output of the first adding means and an output of the second adding means;

cumulative addition means, for receiving an output of the first despreading integration calculating means, an output of the second despreading integration calculating means, an output of the third despreading integration calculating means, an output of the fourth despreading integration calculating means, an output of the first adding means, an output of the second adding means, and an output of the third adding means, and for performing cumulative addition in accordance with the oversampling setting; and storing means, for temporarily storing cumulative addition data that are output from the cumulative addition means.

2. A matched filter circuit which receives reception data and spreading codes externally and operates according to external oversampling setting, comprising:

N data shift register means, for receiving the reception data and for storing and shifting data having prescribed oversampling phases, N being a natural number that is greater than or equal to 2;

N−1 data input route selecting means, each for selecting the reception data or a shift output of a final stage of immediately preceding data shift register means in accordance with the oversampling setting, and for outputting the selected reception data or shift output to immediately following data shift register means;

N code shift register means, for receiving the spreading codes and for storing and shifting spreading codes corresponding to the associated data shift register means, respectively;

N−1 code input route selecting means, each for selecting the spreading codes or a shift output of a final stage of immediately preceding code shift register means in accordance with the oversampling setting, and for outputting the selected spreading codes or shift output to immediately following code shift register means;

N despreading integration calculating means, for performing despreading and integration calculation using outputs of the data shift register means and outputs of the code shift register means;

N−1 adding means, for adding together outputs of the despreading integration calculating means;

cumulative addition means, for receiving outputs of the despreading integration calculating means and outputs of the adding means and for performing cumulative addition in accordance with the oversampling setting; and storing means, for temporarily storing cumulative addition data that are output from the cumulative addition means.

3. The matched filter circuit according to claim 1 or 2, wherein:

the data shift register means and the code shift register means are each controlled divisionally in groups of a number that is equal to an oversampling setting number;

each of the data input route selecting means selects the reception data if it immediately precedes head data shift register means of a group, and selects the reception data or a shift output of the final stage of the immediately preceding data shift register means if it does not immediately precede head data shift register means of a group;

each of the code input route selecting means selects the spreading codes if it immediately precedes head code shift register means of a group, and selects the spreading codes or a shift output of the final stage of the immediately preceding code shift register if it does not immediately precede head code shift register means; and reception data having different oversampling phases are shift-input to the data shift register means of the respective groups, and spreading codes corresponding to the associated data shift register means are shift-input to the respective code shift register means on a group-by-group basis.

4. The matched filter circuit according to claim 1 or 2, wherein:

the data shift register means and the code shift register means are each controlled divisionally in groups of a number that is equal to an oversampling setting number;

each of the data input route selecting means selects the reception data and each of the code input route selecting means selects the spreading codes; and reception data having different oversampling phases are input to the data shift register means of the respective groups so as to be assigned cyclically to the data shift register means of each group, and spreading codes corresponding to the associated data shift register means are input to the respective code shift register means on a group-by-group basis so as to be assigned cyclically to the code shift register means of each group.

5. The matched filter circuit according to claim 1 or 2, wherein the data shift register means are controlled divisionally in groups of a number that is equal to a maximum oversampling setting number, and clock signals having different phases are applied to the data shift register means of the respective groups.

6. A matched filter circuit which receives reception data and spreading codes externally and operates according to external oversampling setting, comprising:

N data shift register means, for receiving the reception data and for storing and shifting data having prescribed oversampling phases, N being a natural number that is greater than or equal to 2;

N code shift register means, for receiving the spreading codes and for storing and shifting spreading codes corresponding to the associated data shift register means, respectively;

N despreading integration calculating means, for performing despreading and integration calculation using outputs of the data shift register means and outputs of the code shift register means;

N−1 adding means, for adding together outputs of the despreading integration calculating means;

cumulative addition means, for receiving outputs of the despreading integration calculating means and outputs of the adding means and for performing cumulative addition in accordance with the oversampling setting; and storing means, for temporarily storing cumulative addition data that are output from the cumulative addition means, wherein the N data shift register means and the N code shift register means are each controlled divisionally in groups of a number that is equal to an oversampling setting number; and wherein reception data having different oversampling phases are input to the data shift register means of the respective groups so as to be assigned cyclically to the data shift register means of each group, and spreading codes corresponding to the associated data shift register means are input to the respective code shift register means on a group-by-group basis so as to be assigned cyclically to the code shift register means of each group.

* * * * *